US010679157B2

(12) United States Patent
Mitchell

(10) Patent No.: US 10,679,157 B2
(45) Date of Patent: *Jun. 9, 2020

(54) SYSTEM AND METHOD FOR TRACKING DRIVER HOURS AND TIMEKEEPING

(71) Applicant: FLEETMATICS IRELAND LIMITED, Dublin (IE)

(72) Inventor: Peter Mitchell, Dublin (IE)

(73) Assignee: VERIZON CONNECT IRELAND LIMITED, Dublin (IE)

( * ) Notice: Subject to any disclaimer, the term of this patent is extended or adjusted under 35 U.S.C. 154(b) by 242 days.

This patent is subject to a terminal disclaimer.

(21) Appl. No.: 13/837,721

(22) Filed: Mar. 15, 2013

(65) Prior Publication Data
US 2013/0289873 A1 Oct. 31, 2013

Related U.S. Application Data

(60) Provisional application No. 61/639,426, filed on Apr. 27, 2012.

(51) Int. Cl.
| G06Q 10/06 | (2012.01) |
| G06Q 10/08 | (2012.01) |
| G07C 5/00 | (2006.01) |
| G07C 5/02 | (2006.01) |
| G06F 17/00 | (2019.01) |

(52) U.S. Cl.
CPC ..... *G06Q 10/063114* (2013.01); *G06F 17/00* (2013.01); *G06Q 10/06* (2013.01); *G06Q 10/08* (2013.01); *G07C 5/008* (2013.01); *G07C 5/02* (2013.01)

(58) Field of Classification Search
CPC ........... G06Q 10/06; G06Q 10/063114; G06Q 10/0639; G06Q 10/06398; G06Q 50/28; G06Q 50/30; G06F 17/00; G07C 5/008; G07C 5/02; G01C 21/36; G08G 1/20; G06C 50/28; G06C 50/30
USPC ............................................ 701/482; 705/32
See application file for complete search history.

(56) References Cited

U.S. PATENT DOCUMENTS

| 4,974,170 A | 11/1990 | Bouve et al. |
| 5,025,261 A | 6/1991 | Ohta et al. |
| 5,223,844 A | 6/1993 | Mansell et al. |
| 5,430,656 A | 7/1995 | Dekel et al. |
| 5,652,707 A | 7/1997 | Wortham |
| 5,682,525 A | 10/1997 | Bouve et al. |
| 5,774,830 A | 6/1998 | Tsuji |
| 6,067,007 A | 5/2000 | Gioia |
| 6,148,260 A | 11/2000 | Musk et al. |

(Continued)

FOREIGN PATENT DOCUMENTS

| DE | 10151354 | 5/2003 |
| DE | 10 2006 056 874 | 6/2008 |

(Continued)

OTHER PUBLICATIONS

International Preliminary Report on Patentability for PCT/EP2012/071304 dated May 15, 2014.

(Continued)

*Primary Examiner* — Hunter B Lonsberry
*Assistant Examiner* — Donald J Wallace

(57) ABSTRACT

A system and method for processing GPS event data and providing an interface for presentation of timekeeping reports and alerts.

24 Claims, 30 Drawing Sheets

(56) References Cited

U.S. PATENT DOCUMENTS

| | | | |
|---|---|---|---|
| 6,181,911 B1 | 1/2001 | Sih et al. | |
| 6,195,041 B1 | 2/2001 | Gardner et al. | |
| 6,339,745 B1 | 1/2002 | Novik | |
| 6,505,106 B1 | 1/2003 | Lawrence et al. | |
| 6,862,524 B1 | 3/2005 | Nagda et al. | |
| 7,040,435 B1 | 5/2006 | Lesesky et al. | |
| 7,155,321 B2 | 12/2006 | Bromley et al. | |
| 7,246,009 B2* | 7/2007 | Hamblen et al. | 701/517 |
| 7,388,518 B2* | 6/2008 | Mitchell et al. | 340/988 |
| 7,561,054 B2 | 7/2009 | Raz et al. | |
| 7,587,278 B2 | 9/2009 | Poe et al. | |
| 7,827,507 B2 | 11/2010 | Geise et al. | |
| 8,140,358 B1 | 3/2012 | Lin et al. | |
| 8,577,935 B2 | 1/2013 | Keaveny et al. | |
| 8,416,067 B2* | 4/2013 | Davidson et al. | 340/426.1 |
| 2004/0039504 A1* | 2/2004 | Coffee | B28C 5/422 |
| | | | 701/482 |
| 2004/0218910 A1 | 11/2004 | Chang et al. | |
| 2004/0249565 A1 | 12/2004 | Park | |
| 2004/0254698 A1 | 12/2004 | Hubbard et al. | |
| 2004/0260585 A1* | 12/2004 | Spangenberg | G06Q 10/06 |
| | | | 705/35 |
| 2005/0154769 A1 | 7/2005 | Eckart et al. | |
| 2006/0116819 A1 | 6/2006 | Soundararajan | |
| 2006/0155439 A1 | 7/2006 | Slawinski et al. | |
| 2006/0200008 A1 | 9/2006 | Moore-Ede | |
| 2006/0213731 A1* | 9/2006 | Lesesky et al. | 188/158 |
| 2007/0120986 A1 | 5/2007 | Nunomaki | |
| 2007/0150188 A1 | 6/2007 | Rosenberg | |
| 2007/0239322 A1 | 10/2007 | McQuade et al. | |
| 2007/0241882 A1* | 10/2007 | Panttaja et al. | 340/521 |
| 2007/0266180 A1 | 11/2007 | Mitchell et al. | |
| 2008/0300784 A1 | 12/2008 | Kleinstern et al. | |
| 2009/0135730 A1 | 5/2009 | Scott et al. | |
| 2009/0138188 A1 | 5/2009 | Kores et al. | |
| 2009/0326991 A1* | 12/2009 | Wei et al. | 705/5 |
| 2010/0057334 A1 | 3/2010 | Ramaswamy et al. | |
| 2010/0088163 A1* | 4/2010 | Davidson et al. | 705/11 |
| 2010/0100507 A1 | 4/2010 | Davidson et al. | |
| 2010/0125409 A1 | 5/2010 | Prehofer | |
| 2010/0203901 A1 | 8/2010 | Dinoff et al. | |
| 2010/0215250 A1 | 8/2010 | Zhu | |
| 2011/0093291 A1 | 4/2011 | Leistner | |
| 2011/0071867 A1 | 5/2011 | Chen et al. | |
| 2011/0112717 A1 | 5/2011 | Resner | |
| 2011/0119200 A1 | 5/2011 | Hatta | |
| 2011/0122775 A1 | 5/2011 | Zampetti et al. | |
| 2011/0153367 A1 | 6/2011 | Amigo et al. | |
| 2011/0153477 A1* | 6/2011 | Niazi | 705/32 |
| 2011/0161102 A1 | 6/2011 | Leistner | |
| 2011/0161380 A1* | 6/2011 | Keaveny | G06Q 10/06 |
| | | | 707/812 |
| 2011/0191135 A1 | 8/2011 | Williams et al. | |
| 2011/0307297 A1* | 12/2011 | Leistner | 705/7.33 |
| 2012/0000462 A1 | 1/2012 | Edwards et al. | |
| 2012/0066030 A1 | 3/2012 | Limpert | |
| 2012/0209754 A1* | 8/2012 | Sivasubramaniam | 705/32 |
| 2012/0246039 A1* | 9/2012 | Fain et al. | 705/32 |
| 2012/0256770 A1 | 10/2012 | Mitchell | |
| 2012/0259545 A1 | 10/2012 | Mitchell | |
| 2013/0007626 A1 | 1/2013 | Adams et al. | |
| 2013/0164715 A1* | 6/2013 | Hunt et al. | 434/65 |
| 2013/0225196 A1 | 8/2013 | James et al. | |
| 2013/0297468 A1* | 11/2013 | Hirsch | G06Q 40/00 |
| | | | 705/32 |

FOREIGN PATENT DOCUMENTS

| | | |
|---|---|---|
| GB | 2337653 | 11/1999 |
| GB | 2 345 824 | 7/2000 |
| WO | WO 2008/065131 | 6/2008 |
| WO | WO 2010/027469 | 3/2010 |

OTHER PUBLICATIONS

International Preliminary Report on Patentability for PCT/EP2012/071217 dated May 15, 2014.

International Search Report and a Written Opinion (PCT/EP2014/069560) dated Nov. 26, 2014.

Iman M. Almomani et al "Ubiquitous GPS Vehicle Tracking and Management", Applied Electrical Engineering and Computing Technologies (AEECT), 2011 IEEE Jordan Conference on, IEEE. Dec. 6, 2011, pp. 1-6, XP032097253, DOI:10, 1109/AEECT.2011.6132526 ISBN:978-1-4577-1083-4 (D3).

International Search Report and a Written Opinion ( PCT/EP2014/069556) dated Dec. 22, 2014.

* cited by examiner

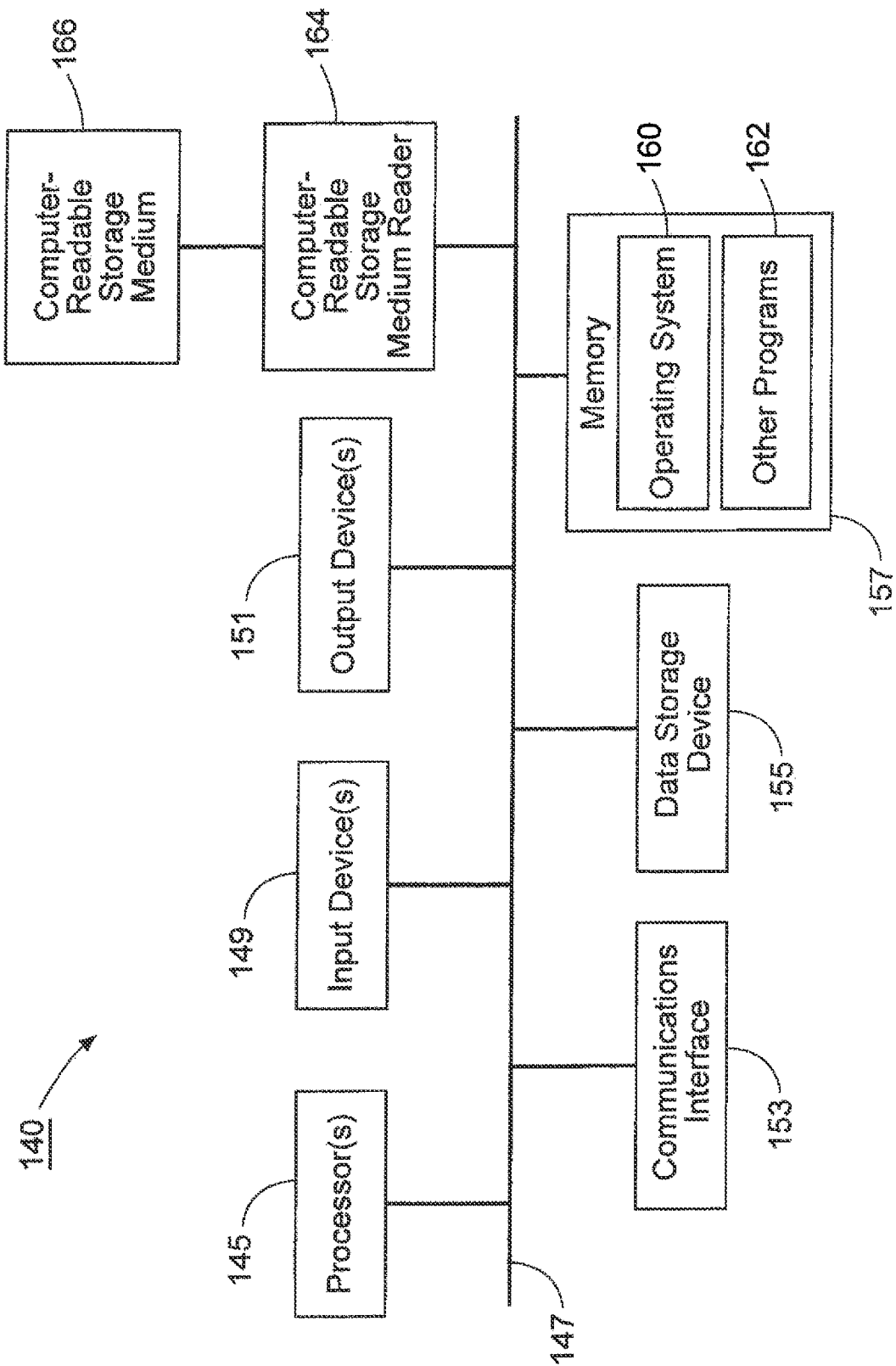

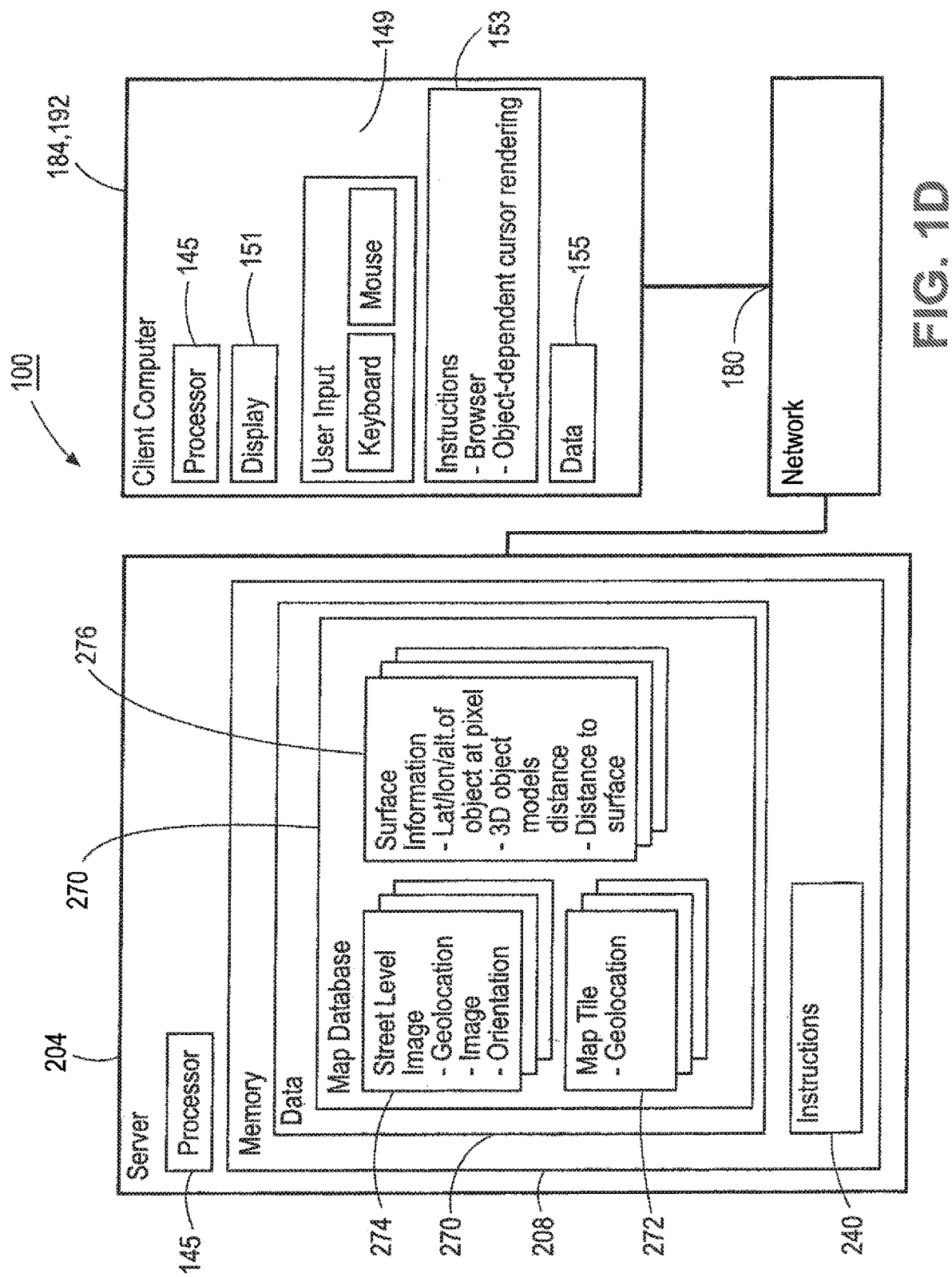

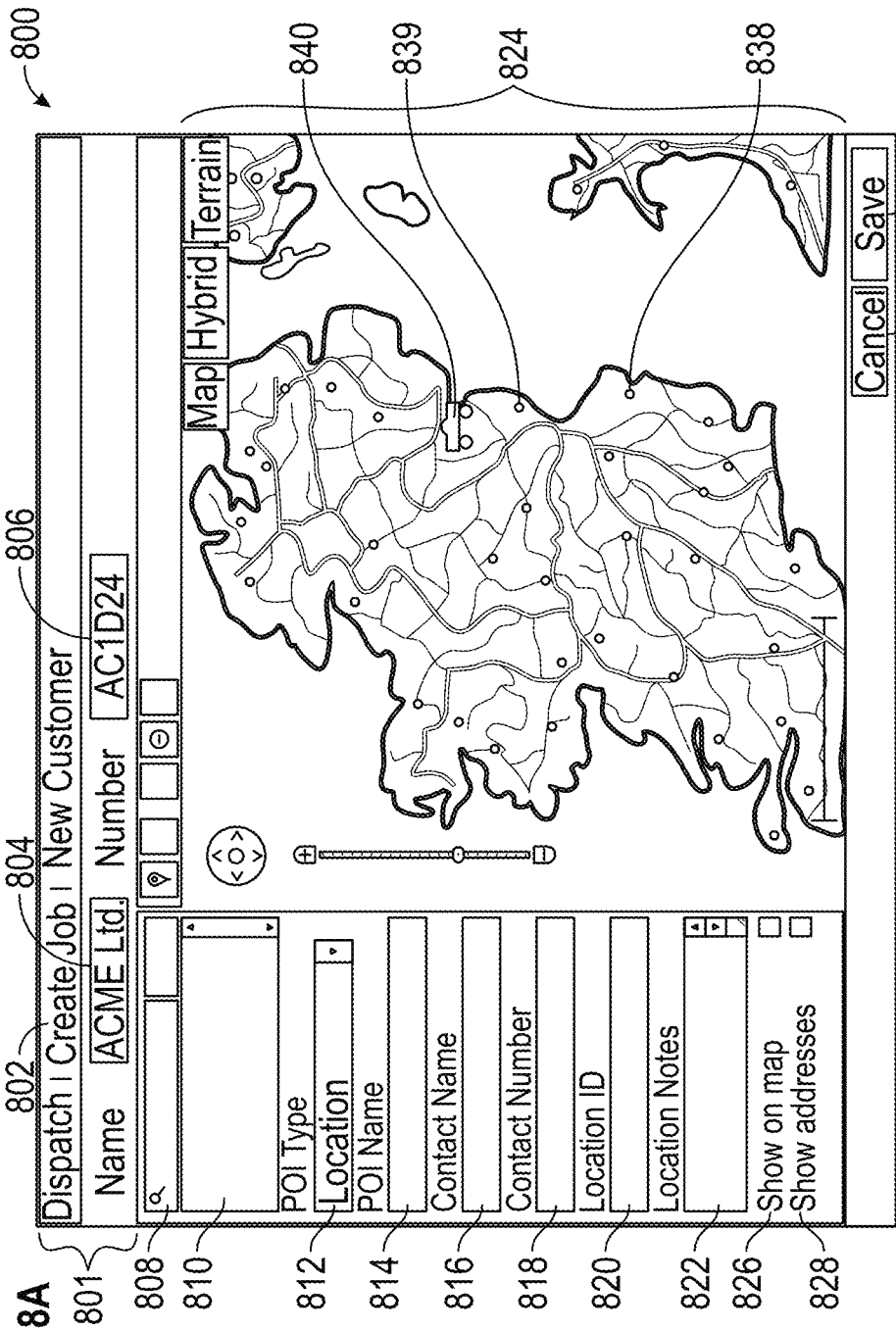
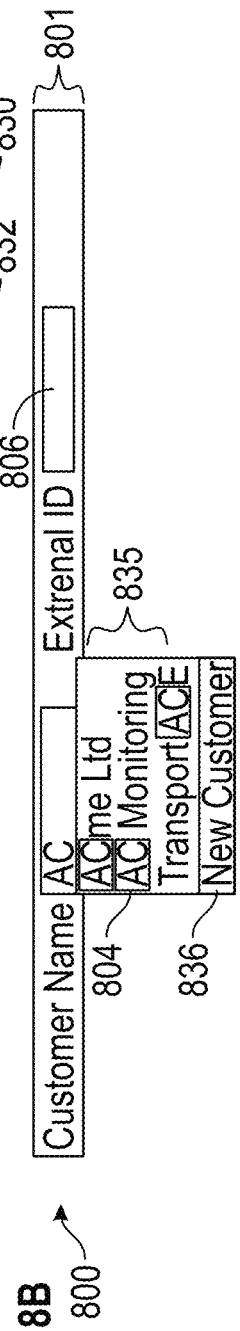
FIG. 8A
FIG. 8B

FIG. 11A

[Timecard Report diagram with labels:]
- 1105: John Smith - Vehicle 47
- 1108: (Vehicle 47)
- 1112: Timecard Report
- 1120: Total Hours Worked: 08:01 / Total Overtime: 00:45
- 1110, 1122: 
- 1114: Total Travel Duration: 102:06 / Total Stop Duration: 103:08
- 1124, 1126
- 1118: Arrival Time | Location | Travel Duration | Distance Traveled | Stop Duration | Notes
- 1128
- 1116a, 1116b, 1116c: data rows
- 1115: grouped section
- 1129: signature section
- 1130: Driver Signature
- 1131: Manager Signature

FIG. 11B

[Weekly Timesheet Report diagram with labels:]
- 1102: 7/25 - 7/29
- 1134: Weekly Timesheet Report
- 1136: Exceptions
- 1104
- 1106: Report Start: 7/25/2011 / Report End: 7/29/2011
- 1140, 1142, 1144, 1110, 1108, 1146, 1126: Hours worked: 42 hrs / Overtime: 2 hrs
- 1148: Avg Start Time: 8:02 am / Avg End Time: 4:46 pm
- 1138: Date | Start Time | End Time | Hours Worked | Break Duration | Stop Duration | Overtime
- 1105: Vehicle 123 (John Smith)
- 1132a, 1132b, 1132c: data rows
- Totals: Days Worked: 1 | 08:02 | 02:02 | 01:02 | 00:02
- 1115
- 1129: signature section
- 1130: Driver Signature
- 1131: Manager Signature

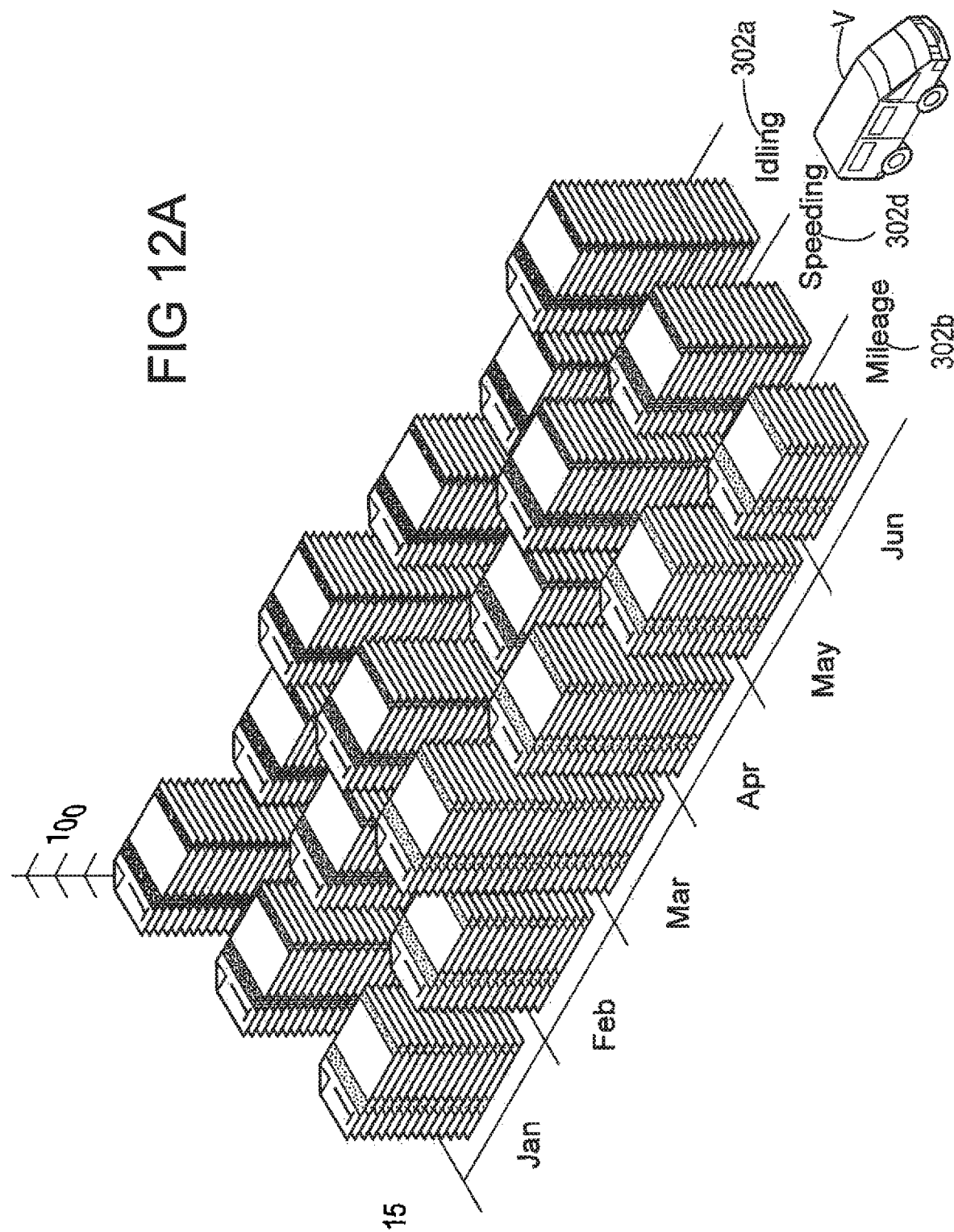

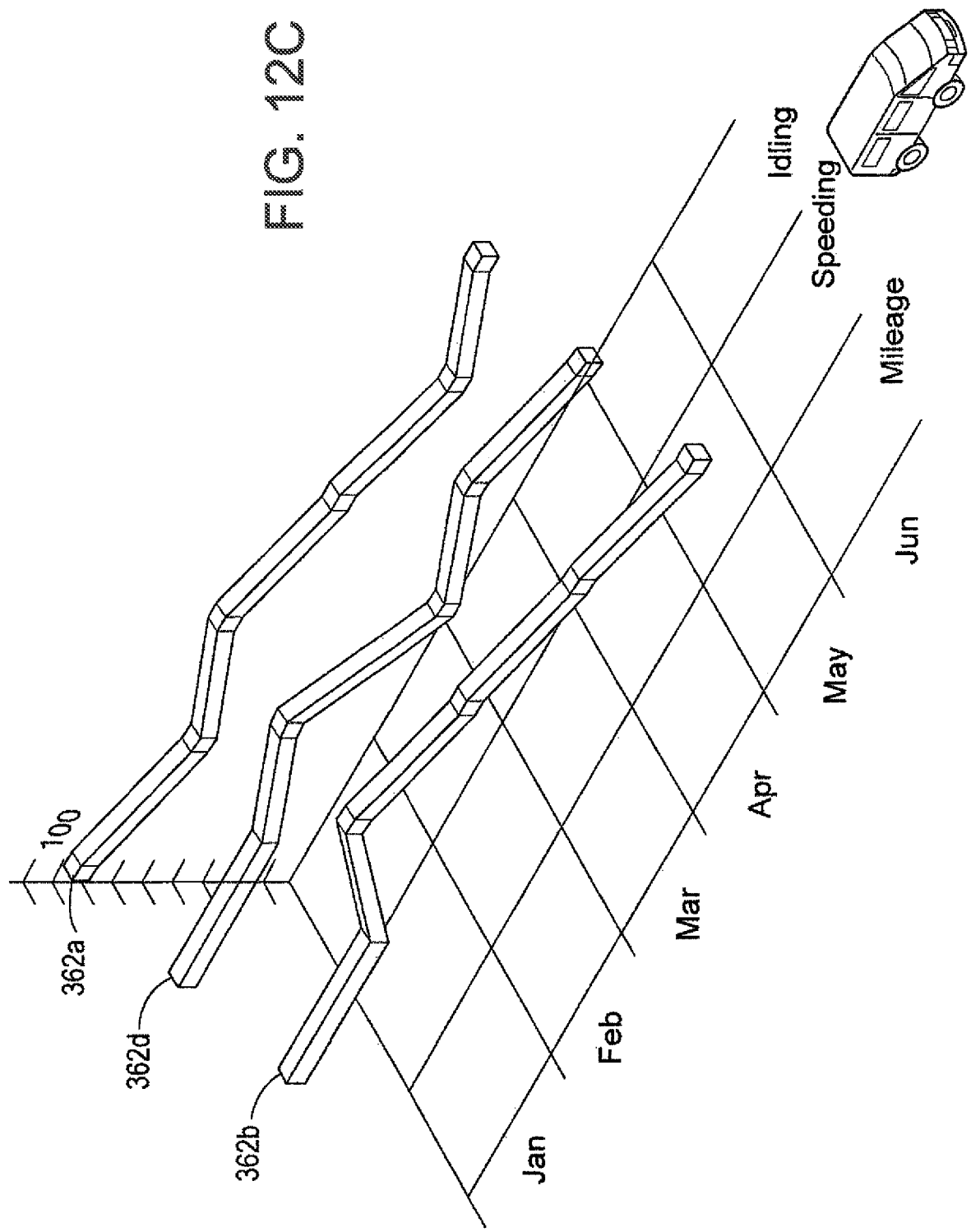

SYSTEM AND METHOD FOR TRACKING DRIVER HOURS AND TIMEKEEPING

CROSS-REFERENCE TO RELATED APPLICATIONS

This application claims priority to U.S. provisional patent application No. 61/639,426, filed Apr. 27, 2012, and titled "SYSTEM AND METHOD FOR TRACKING DRIVER HOURS AND TIMEKEEPING," the entirety of which is incorporated herein by reference.

DESCRIPTION OF RELATED ART

It is known to provide an on-board unit which uses technology such as GPS (Global Positioning System) to monitor a vehicle's positions and transmit wireless uploads to a central host system as well as manage of incoming data traffic without data losses or corruption and/or without database record locking. Such a unit may also upload vehicle status events such as engine fault events. GB2345824 and U.S. Pat. No. 7,388,518 describes such systems and methods therefor, the entirety of each of which are incorporated by reference herein.

SUMMARY OF THE INVENTION

Described are embodiments of method and a computer system including at least one computer processor and computer readable storage medium or media including computer code and at least one storage device in which is stored GPS data for a plurality of vehicles the system comprising: a memory including a GPS event database including GPS event data transmitted from a plurality of GPS devices, each GPS device associated with a vehicle, and stored over a period of time, and the one or more processors programmed at least to receive GPS event data transmitted from a plurality of GPS devices, each GPS device associated with a vehicle; store the GPS event data in the GPS event database operatively coupled to at least one of the processors; and analyze the GPS event data to derive a plurality of operational metrics for a plurality of the vehicle, wherein at least one of the operational metrics is used as a timekeeping parameter for tracking working time for a driver. The operational metric including an operational metric selected from the group of: ignition ON, first movement, arrival at first stop, arrival at first work order, arrival at one or more locations or areas, departure from one or more locations or areas, ignition. OFF, last movement, departure from last stop, departure from last work order, and last departure from one or more locations or areas.

The computer system can be configured to run a Daily Timecard Report.

The computer system can be configured to run a Weekly Timesheet Report.

The computer system can be configured to run a Payroll Comparison Report for a plurality of drivers.

The computer system can be configured to display driver status information for a graphic user interface.

The computer system can be configured to display driver status information in a report. The report can include a report selected from an Excess Payroll Report and an Off-hours Use Report.

The computer system can be configured to display the driver status information as an alert.

The computer system can be configured to display an alert selected from Overtime Alert and an Off-hours Use Alert.

The computer system can be configured to provide, for a graphic user interface, a representation including a representation of the at least one trend. The computer system can be configured to identify a trend for an operational metric for the plurality of vehicles, the operational metric including an operational metric. The operational metric can include: an Hours Worked metric a Late Start metric, and an Overtime metric.

Described are embodiments of method comprising, in at least one computer and a computer readable storage medium or media including computer code receiving GPS event data transmitted from a plurality of GPS devices, each GPS device associated with a vehicle; storing in GPS event database operatively coupled to at least one of the processors, the GPS event data and peer comparison data; analyzing the GPS event data to derive a plurality of operational metrics for a plurality of the vehicles, wherein at least one of the operational metrics is used as a timekeeping parameter for tracking working time for a driver. The operational metric including an operational metric selected from the group of: ignition ON, first movement, arrival at first stop, arrival at first work order, arrival at one or more locations or areas, departure from one or more locations or areas, ignition OFF, last movement, departure from last stop, departure from last work order, and last departure from one or more locations or areas.

The method can comprise running a Daily Timecard Report.

The method can comprise running a Weekly Timesheet Report.

The method can comprise running a Payroll Comparison Report for a plurality of drivers.

The method can comprise displaying driver status information for a graphic user interface.

The method can comprise displaying driver status information in a report. The report can include a report selected from an Excess Payroll Report and an Off-hours Use Report.

The method can comprise presenting the driver status information as an alert.

The method can comprise displaying an alert selected from Overtime Alert and an Off-hours Use Alert.

The method can comprise providing, for a graphic user interface, a representation including a representation of the at least one trend.

The method can comprise identifying a trend for an operational metric for the plurality of vehicles, the operational metric including an operational metric. The operational metric can includes: a Hours Worked metric, a Late Start metric, and an Overtime metric.

Throughout the specification and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. Embodiments of the present invention are disclosed or are apparent from and encompassed by, the following description.

It will be appreciated by those skilled in the art that the foregoing brief description and the following detailed description are exemplary (i.e., illustrative) and explanatory of the present invention, but are not intended to be restrictive thereof or limiting of the advantages which can be achieved by this invention in various implementations. Additionally, it is understood that the foregoing summary and ensuing detailed description are representative of some embodiments of the invention, and are neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of embodiments of the invention.

BRIEF DESCRIPTION OF THE DRAWINGS

Embodiments are illustrated in the figures of the accompanying drawings, which are meant to be exemplary and not limiting, and in which like references are intended to refer to like or corresponding things.

FIGS. 1A-1D are block diagrams of a representative computer system.

FIGS. 8A-8B depict exemplary representations of pages for creating or searching for customers and creating jobs for a graphic user interface.

FIGS. 11A to 11D depict exemplary representations of pages for Timecard Reports for a Graphic User interface.

FIGS. 12A-12C are an exemplary flow showing GPS event data analysis.

DETAILED DESCRIPTION OF THE EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The present invention will now be described in detail on the basis of exemplary embodiments. The invention disclosed herein may be practiced using programmable digital computers and networks therefor.

Figure 1B:
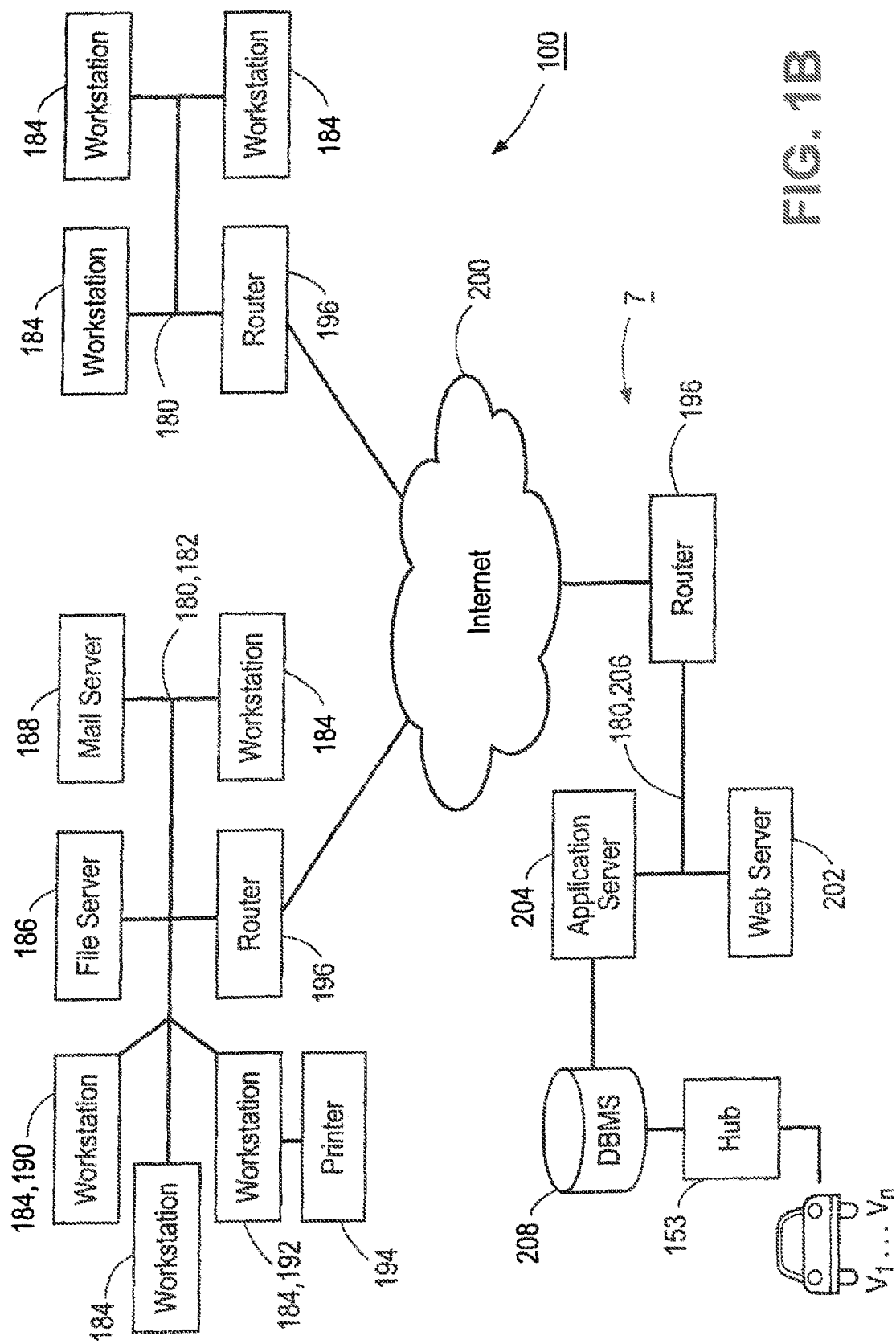

As shown in FIGS. 1A-1B, disclosed is a system 100, which includes a computer 140 containing a processor 145, memory 157 and other components typically present in general purpose computers.

FIG. 1A is a block diagram of a representative computer. The computer system 140 includes at least one processor 145, such as an Intel Core™ or Xeon™ series microprocessor or a Freescale™ Power PC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network such as the Internet.

Memory 157 stores information accessible by processor 145, including instructions that may be executed by the processor 145. It also includes data that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 145 may be any well-known processor, such as processors from Intel Corporation or AMD. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store an operating system 160 such as Microsoft Windows 7®, Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified by processor 145 in accordance with the instructions. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., REG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Accordingly, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Two or more computer systems 140 may be connected, e.g., in one or more networks, via, e.g., their respective communications interfaces 155 and/or network interfaces (not depicted).

A computer system network is shown in FIG. 1B. A network 182 may, for example, connect one or more workstations 184 with each other and with other computer systems, such as file servers 186 or mail servers 188. The connection may be achieved tangibly, e.g., via. Ethernet® or optical cables, or wirelessly, e.g., through use of modulated microwave signals according to the IEEE 802.11 family of standards. A computer system that participates in the network may send data to another computer system in the network via the network connection.

One use of a network 180 is to enable a computer system to provide services to other computer systems, consume services provided by other computer systems, or both. For example, a file server 186 may provide common storage of files for one or more of the workstations 190 on a network 182. A workstation 190 sends data including a request for a file to the file server 186 via the network 182 and the file server 186 may respond by sending the data from the file back to the requesting workstation 190.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

In one aspect, computer 204 is a server communicating with one or more client computers 184,192. For example, computer 204 may be a web server or a hub and data storage service. Each client computer may be configured similarly to the server 184, 192, with a processor, memory and instructions 240. Each client computer 184, 192 may be a personal computer, intended for use by a person, having all the internal components normally found in a personal computer such as a central processing unit (CPU), display device 151 (for example, a monitor having a screen, a projector, a touch-screen, a small LCD screen, a television, or another device such as an electrical device that is operable to display information processed by the processor), CD-ROM, hard-drive, user input 149 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 184, 192 may comprise a full-sized personal computer, the system and method may also be used in connection with mobile devices capable of wirelessly exchanging data with a server over a network such as the Internet. For example, client computer 1184,192 may be a wireless-enabled PDA such as an iPhone, and Android enabled smart phone, a Blackberry phone, or another Internet-capable cellular phone. In either regard, the user may input information using a small keyboard (in the case of a Blackberry phone), a keypad (in the case of a typical cell phone), a touch screen (in the case of a PDA and/or smart phone) or any other means of user input.

Client computers 184, 192 may include a component, such as circuits, to determine the geographic location of the device. For example, mobile device may include a GPS receiver. By way of further example, the component may include software for determining the position of the device based on other signals received at the mobile device, such as signals received at a cell phone's antenna from one or more cell phone towers if the mobile device is a cell phone.

Servers 186, 188, 202, 204 and client computers 184 and 192 are capable of direct and indirect communication, such as over a network 180, 200. Although only a few computers are depicted in FIGS. 1A-1B, it should be appreciated that a typical system can include a large number of connected computers, with each different computer being at a different node of the network 200. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196

A network of networks 180 may be referred to as an internet. The term "the Internet" 200 refers to the worldwide network of interconnected, packet-switched data networks that uses the Internet Protocol (IP) to route and transfer data.

A client and server on different networks may communicate via the Internet 200. For example, a workstation 190 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network.

For example in one embodiment, an on-board GPS unit uploads information (eg. via a hub 153) about a vehicle v1, v2 . . . vn to a central host system 208. Information about the vehicle derived from the GPS information can be presented to a user on a display device 151, for example, as a layout shown in FIG. 2.

Figure 2:
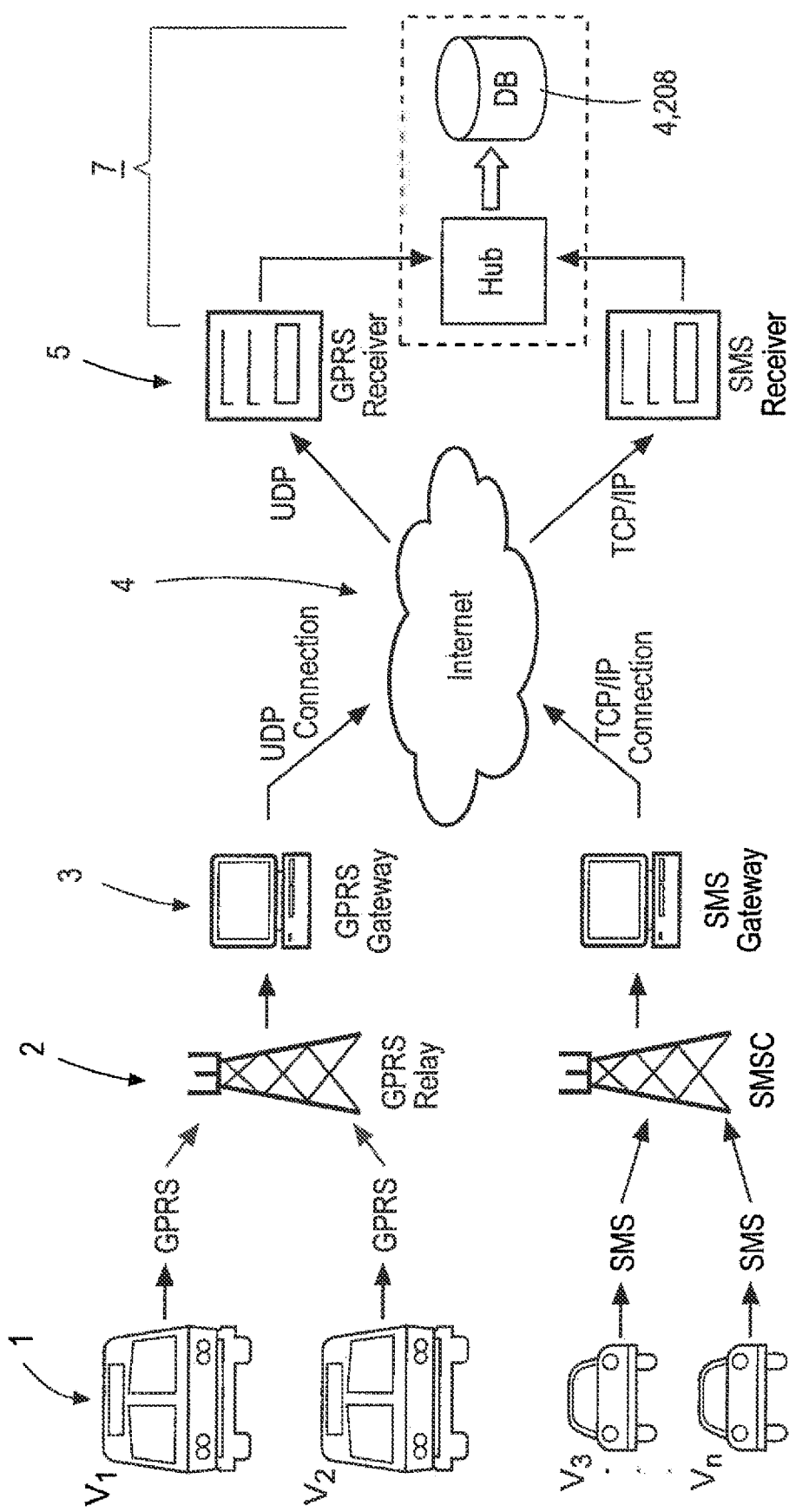
FIG. 2 depicts a representative GPS system.

In one embodiment, the system is programmed at least to receive GPS even data recorded by a GPS (Global Positioning System) device, for example, using an on-board unit which uses technology such as GPS to monitor a vehicle's positions and transmit wireless uploads to a central host system. Commercially available on-board unit GPS (Global Positioning System) devices include those provided by Garmin®, TomTom®, and Magellan®. Referring to FIG. 2 a vehicle tracking system comprises on-board units 1 in vehicles v1, v2, v3 . . . , vn, which communicate wirelessly via mobile networks 2 to gateways 3. In this diagram two wireless protocols are indicated, namely GPRS and SMS. However there are typically a variety of additional protocols. The gateways 3 communicate using protocols such as UDP and TCP via the Internet 4 with a host system 7 having receivers 5 which are operating system services, and a data storage system 6. The incoming data is written from the receivers 5 to the data storage system 6, which includes a communication huh 153 and database 208. GB2345824 and U.S. Pat. No. 7,388,518 describes such systems and methods therefor, the entirety of each of which are incorporated by reference herein.

Figure 1C:
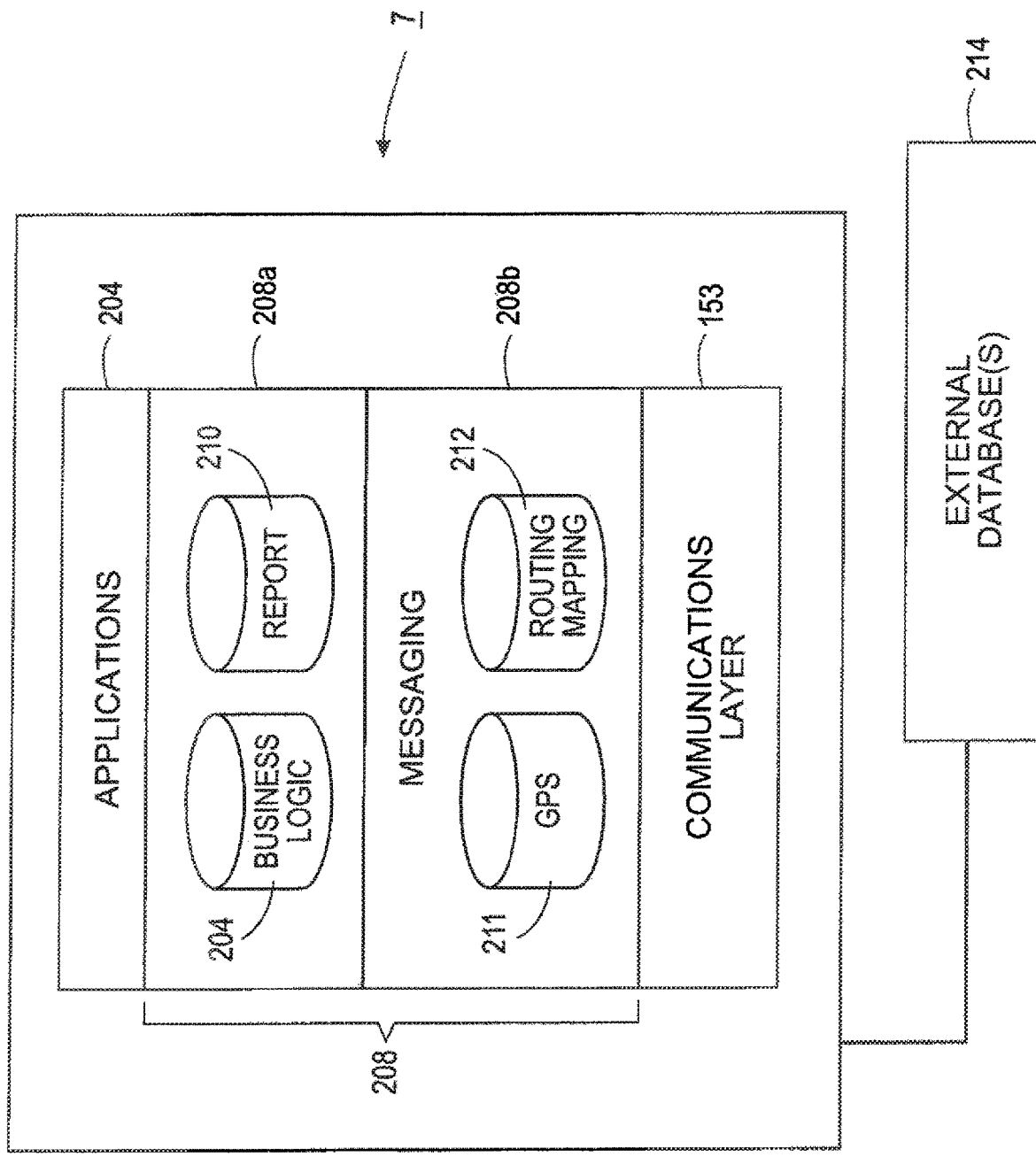

FIG. 1C is a block diagram of a host system 7 showing an exemplary system configuration for a host system 7. As shown therein, a communications layer 153 is operable to receive incoming GPS data and write data from the receivers 5 to the data storage system 208. The data storage system can be divided into any number of databases and logical layers for data analysis and storage. For example, a messaging layer 208*b* can be configured to store GPS event data from GPS on-board units 1 in a GPS event database 211. A separated routing database 212 could be provided to store mapping and route data based on, inter alia, GPS data to store routes traveled by vehicles. Another database layer 208*a* can include a business logic database 204 and a reporting database 210 to store rules for analysis of data and reports analyzed data respectively. Another database layer can include at least one database including job data or vehicle dispatch data for a vehicle fleet. For instance, one or more job databases can include job data comprising, for example, job types, drivers associated with vehicles, customer data, and other types of dispatch data as described herein.

A database layer 208*b* can be operably connected to other databases, for example external databases 204. For example the system can be operatively connected to at least one speed database including speed data or traffic data. For instance, one or more speed databases can include speed data comprising, for example, a record of a posted speed limit for a route and/or a record of an average traffic/road speed for a route.

For example, an external database 204 can provide traffic data which shows congestion along routes to be traveled by a vehicle, which can be used in conjunction with GPS data 211 and business logic 204 to reroute vehicles or create reports as to congested routes. An applications layer 204, such as an application sever 204, can be used to run applications processing, which may include, for example, sending data to and/or receiving data from one or more other data sources such as client workstations 184, 190, as described above. For example the application layer 204 can be used to provide a graphic user interface 151 of a client workstation 184,194 a user-interactive interface.

In another example an external database 204 can provide speed and or traffic data which records data for posted speed limits along routes, or collects and stores data for average traffic speeds along routes. Exemplary databases include, for example, the TeleAtlas™ speed limit data, or Inrix™ average speed data. This data can be used in conjunction with GPS data 211 and business logic 204 to show speed violations of vehicles and drivers, compare average speeds of a driver's and/or a fleet's average traffic/road speed, and track performance and create alerts as described herein.

An applications layer 204, such as an application sever 204, can be used to run applications processing, which may include, for example, sending data to and/or receiving data from one or more other data sources such as client workstations 184, 190, as described above. For example the application layer 204 can be used to provide a graphic user interface 151 of a client workstation 184,194 a user-interactive interface.

The client terminal 184,194 may include any computing terminal, such as a personal computer, a handheld device, or any other currently existing or later developed computing terminals. Further, it should be understood that the client terminal 184,194 may connect to the gateway(s) 3 via wireless communication links, wireline communication links, or a combination thereof, as described herein. In general, according to the example embodiments described herein, the client terminal 184,194 is a computer that allows a user such as a fleet manager or dispatcher to actively manage a fleets of vehicles and drivers therefor, and uses software that creates specialized fleet management screens on the client terminal. The range and quality of features available to the fleet manager on his or her client terminal's screen may vary according to the specific software application being run on the client terminal 106. Among other functional features, a fleet management screen being run on the client terminal 106 may enable fleet managers to, inter alia, view and manage vehicles and drivers therefor orders, view and edit alerts and exceptions, and monitor fleet and vehicle performance and activity. However, it should be understood that, in addition to interactive trading screens, the client terminal 184, 194 may also run automated non-interactive types of trading applications.

A commercially available application that allows fleet owner to manage and direct fleet activity and performance like embodiments described is FleetMatics GPS fleet tracking. However, the preferred embodiments are not limited to any particular product that performs translation, storage and display functions.

In one embodiment, a system is configured to received, store, and process GPS data to provide to a graphic user interface of a client a user-interactive interface for tracking and reporting on vehicles and vehicle fleets. For each vehicle, GPS event data is stored for over an operation period. For example, the data can be stored and processed to show event data for at least one vehicle v for an operation period of a workday, a week, a month, a quarter, a year, the life of a service contract, or any desirable time period. The GPS event data can then be analyzed to derive a plurality of operational metrics for each vehicle. Exemplary operational metrics that can be derived from GPS data include: engine on/off, vehicle mileage, idling, number of stops, distance traveled, and speed (including high speed and average speed). For example, an on-board GPS device can be configured to be operational to transmit when a vehicle engine is on, thus engine on/off time can be derived. Idling (stopped while engine running) and speeding (distance/time), as well as vehicle mileage can also be derived from tracking via GPS. This data in turn can be used to derive a number of other operational metrics, including vehicle activity over a predetermined time period, vehicle operational reports, employee performance (e.g., working hours, deliveries per day), driver behavior (e.g.: speeding violations, idling over limits); and fleet performance (e.g., metrics based on data above derived for multiple vehicles). Accordingly any number of operational metrics can be derived from GPS data, either alone or in conjunction with data from other databases, including number of stops per vehicle, performance against a criterion, employee performance; driver behavior; and fleet performance, speeding severity, a speeding violation, average vehicle speed, vehicle speed versus a posted speed limit, vehicle speed versus a speed threshold, and an average road speed for a fleet or driver speed for a route versus average road/traffic speed for a route. A graphic user interface can be configured to display including a representation of at least one operational metric for each of a plurality of vehicles.

Figure 3A:
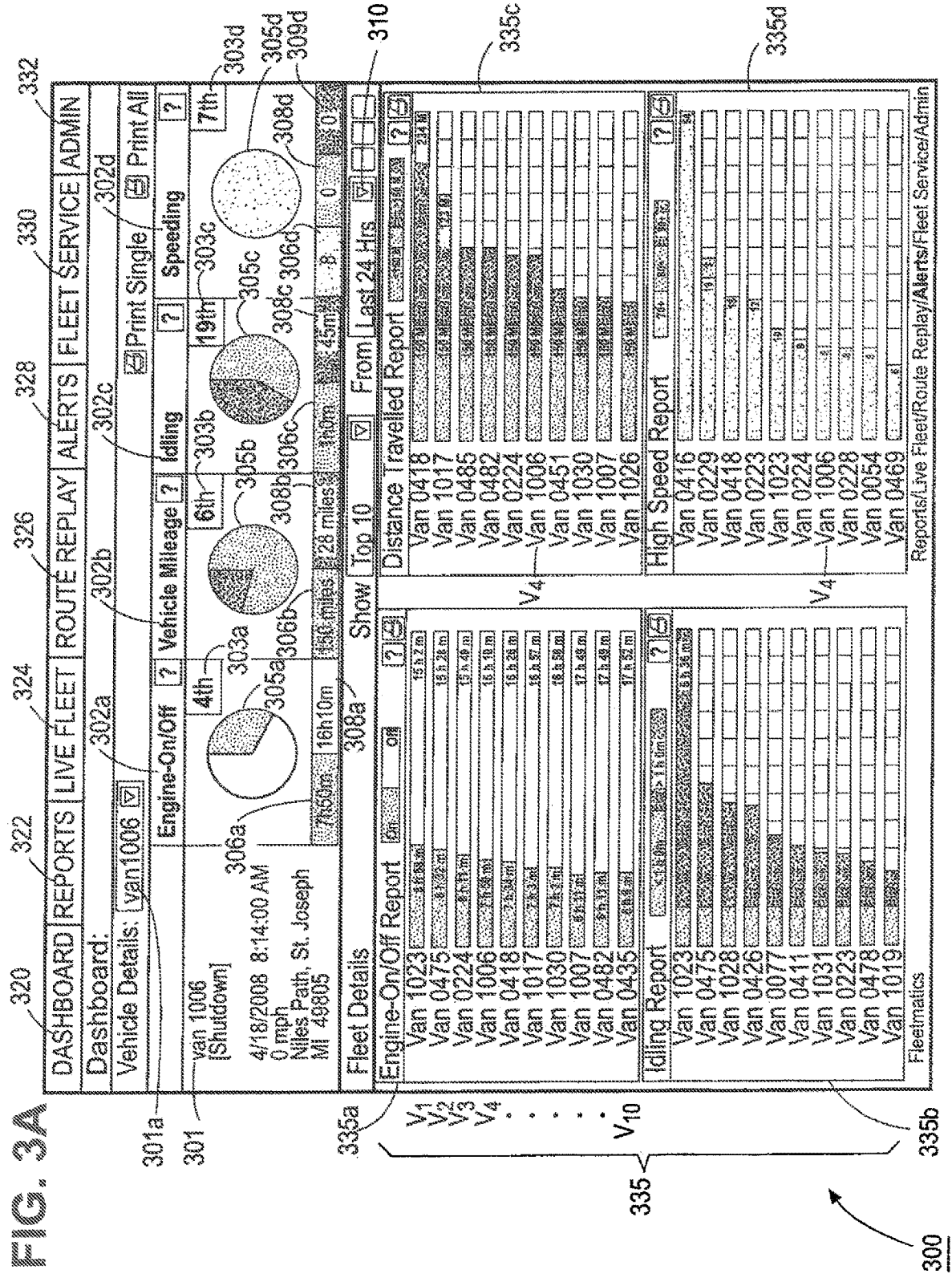
FIGS. 3A-3K depict an exemplary representations of pages for graphic user interface.

Exemplary graphic representations or interfaces 300 for a graphic user interface for a user is shown in FIGS. 3A-3K. Such interfaces could be in the form of application software for computer and digital devices as described above, or in the form of webpage accessed by a client from at least one host server, or any combinations thereof as broadly disclosed herein and without limitation. As shown in FIG. 3A, a "Dashboard" 320 page gives a user a first interactive screen to view GPS data and operational metrics. The top of the graphic user interface 300 has, in one embodiment, tabs for "Reports" 320, "Live Fleet," 332 "Route Replay," 324 "Alerts," 328 Fleet Service," 330 and "Admn" 332, which lead to other user interactive displays. Of course any number of tabs or links could be configured for the features as described herein, for example for "Speed" "Trending," "Score Card," and/or A "MyFleetmatics" or "My Fleet" page which can include user configurable fleet statistics and alerts, or can have default statistics personal to a user, or some mix of user configurable and default features and statistics.

For example, in one embodiment a user can select "Live Fleet" 324 using an input such as a keyboard or a mouse, which would lead to a page with GPS data and mapping software which tracks vehicles v1, v2 . . . vn. The page can allow a user such as a dispatcher to, for example, locate and dispatch the closest vehicle to any job site and reroute the nearest vehicle.

The Dashboard 320, as with any other screen, can be configured to offer preset modules or objects for a user to interact with or view, or in the alternative it can be configured to allow a user to customize the information, reports, alerts, etc most important to the user.

As shown in FIG. 3A, the Dashboard 320 screen includes various graphic representations of operational metrics, including reports and alerts, to aid a user in, among other things, vehicle, employee, and fleet management. For example, the operational metrics 302 for individual vehicles include operational metrics such as a engine on/off 302a, vehicle mileage 302b, idling, 302c, and speeding 302d. Other operational metrics could also be shown such as average speed 302e, number of stops 302f, speeding severity 302h, and speeding violations 302i. Such operational metrics are also shown for various fleet configurations as described below.

The Dashboard 320 shows at the top of the interface 300 a graphic information display for an individual vehicle 301, which can be selected from a drop down menu 301a. Other methods of selection can be used, for example, by selecting with a mouse, a graphic for the vehicle v4 (shown as "Van 1006") in a fleet report graphic 335. The graphic information display for the vehicle 301 includes a reporting and alerts for the vehicle v4, for example, operational metrics such as at least one engine on/off graphic 302a, vehicle mileage graphic 302b, idling graphic 302c, and a speeding graphic 302d.

As shown, the graphics 302a, 302b, 302c, 302d on the individual vehicle 301 is shown reporting graphic that shows a rating 303 under each operational metric comparing the vehicle performance against other vehicles in the fleet for a 24 hour period. For instance, an engine on/off rating graphic 303a puts the vehicle v4 in 4th place in the fleet, a vehicle mileage rating graphic 303b puts the vehicle v4 in 6th place, idling rating graphic at 303c at 19th place, and a speeding rating graphic 303d puts the vehicle v4 at 7th place. These markings for v4 are also seen in the fleet management graph 335a, 335b, 335c as described below.

The interface 300 also provides, for the graphic user interface, an alert when an operational metric for a vehicle exceeds a predetermined threshold established for the operational metric. For example, report graphic on the individual vehicle 301 shows the name of the driver, that the vehicle has shutdown (e.g.: for the end of the workday), the time for shutdown, and for each of the operational metrics, a pie chart graphic 305a, 305b, 305c, 305d, and a split-window graphic 306a/308a, 306b/308b, 306c/308c, 306d8/308d8/309d for the individual's engine on/off, vehicle mileage, idling, and speeding graphics respectively, each of which are designed to alert and report to a user when a vehicle has exceeded a predetermined criterion such as a predetermined threshold. Each of the pie chart 330 and split window graphics 306/308 show the time the vehicle spent within threshold 306, as well as a representation that alerts when the vehicle exceeded the threshold. For example, each metric has in the split window graphic 306/308 a predetermined criterion or threshold 306 established for the 24 hour period: 8 hours for engine on/off 306a, 150 miles for vehicle mileage 306b8/308b, 1.0 hours for idling 306c/308c, and three speeding thresholds of over 70 mph, 80 mph, and 90 mph under speeding 306d8/308d8/309d.

For example, the "Engine On/Off" split window 306a/308a has in a left-hand window, for vehicle operation within the predetermined threshold 306a, a graphic which includes a color (green) and text describing the vehicle's v4 operation statistic under the threshold, 7 hours, 50 m. The right-hand window 308a, shows a window with the time remaining in the 24 hour period (16 hours, 10 min.) Because this is time where the engine was not running, and thus within the threshold, the window 308a is configured to show neutral color or identifier (e.g. white, tan, clear). The pie chart 305a shows a visual with green and neutral coloring corresponding to the times in the split window 306a,308a which allows a user to readily visualize the percentages for the Engine On/Off time.

The "Vehicle Mileage" split window 306b/308b shows the predetermined threshold of 150 miles in the left-hand window 306b, which is in green as with Engine On/Off. However, the right-hand window 308b shows the driver has exceeded the threshold by another 38 miles. As this is in excess of the threshold, where the window 308b is configured to alert the user with a red color. The pie chart 305b shows a visual with green and red coloring corresponding the times in the split window 306b, 308b which allows a user to readily visualize the percentages for the vehicle mileage, as well as alert the user that the vehicle is excess of the threshold.

The Idling and Speeding graphics are similarly configured, thereby proving a user friendly view for all the metrics for the individual vehicle and driver. For example, Idling 302c includes an alerting threshold where of 1 hour, and alerts for excess of an hour of idling. Speeding 302d includes reporting and alerting for, among other things, speeds in excess of 70 mph 306d, 80 mph 308d, and 90 mph 309d, with different colors for each (e.g. green, yellow, and red).

It will be understood that other graphical displays could be used, such as bar graphs, gauge icons, whimsical graphics (e.g., a speedometer or a stopwatch), or any other such graphic as is useful.

For each vehicle v1, v2, v3 . . . vn, historical GPS event data can be stored, as for example, for a plurality of operation periods. Accordingly, while the graphics 302a, 302b, 302c, 302d on the individual vehicle 301 are over an operational 24 hour period, the graphics could be configured to show data for longer periods and/or a plurality of operational periods, such as a week, a month, a quarter, a year, or other periods as desired. Other thresholds could be implemented for each of these periods, as for example, by adding the criteria or thresholds for each operational period, e.g., for Vehicle Mileage 302b, or an 160 hour threshold for a 4 work-week period (a five day week), where each 24 hour period is 8 hours. Other reports can be generated based on the historical event data.

For example, report information can include one or more reports on: vehicle activity over a predetermined time period, speed (including high speed and average speed), number of stops, idling, vehicle operational reports, maintenance, employee performance, driver behavior; and fleet performance.

An exemplary, selectable "Top 10" fleet report 335 shows reports 335a, 335b, 335c, 335d for the top ten vehicles in each of operational metrics for a fleet of vehicles: Engine On/Off 335a, Distance Traveled 335b, Idling Report 335c, and High Speed Report 335d. As noted herein additional metrics for "Speeding Violations," 335i and "Speeding Severity" 335h can be added to the reports relating to speed. Operational metrics for one of the vehicles v4, "Van 1006" is shown at the top of the graphic user interface 301, and the vehicle rankings as shown for v4 are shown in three of the metrics 335a, 335b, and 335d where the vehicle is in the top 10, as described above. While the report shows the "Top 10," a selectable drop down menu 308b allows a user to select any number of options for reporting (e.g., top 20, 50) and another drop down menu 310 allows a user to select time periods (e.g. 24 hours, 5 days, a month), to obtain ranked vehicle performance for the fleet and vehicles therein.

The "Engine On/Off Report" 335 ranks the vehicles v1 . . . v10 from highest to lowest for "Engine On" time over the 24 hours. For example, a row for the top vehicle v1 shows the engine was on for 9 hours and 58 minutes and off for 15 hours and 2 minutes. The lowest ranked v10 (Vehicle 0435) shows engine operation for 6 hours and 8 minutes, whereas the off time is 17 hours and 52 minutes. A tillable bar graph shows on and off times, with "on" being green and off being blank or neutral, with the fill line visually showing the percentage of the 24 hour period. Text graphics write out the time. The rows of bar graphs for each vehicle are aligned in a columnar format so as to readily compare each vehicle's statistics with one another.

Figure 3B:
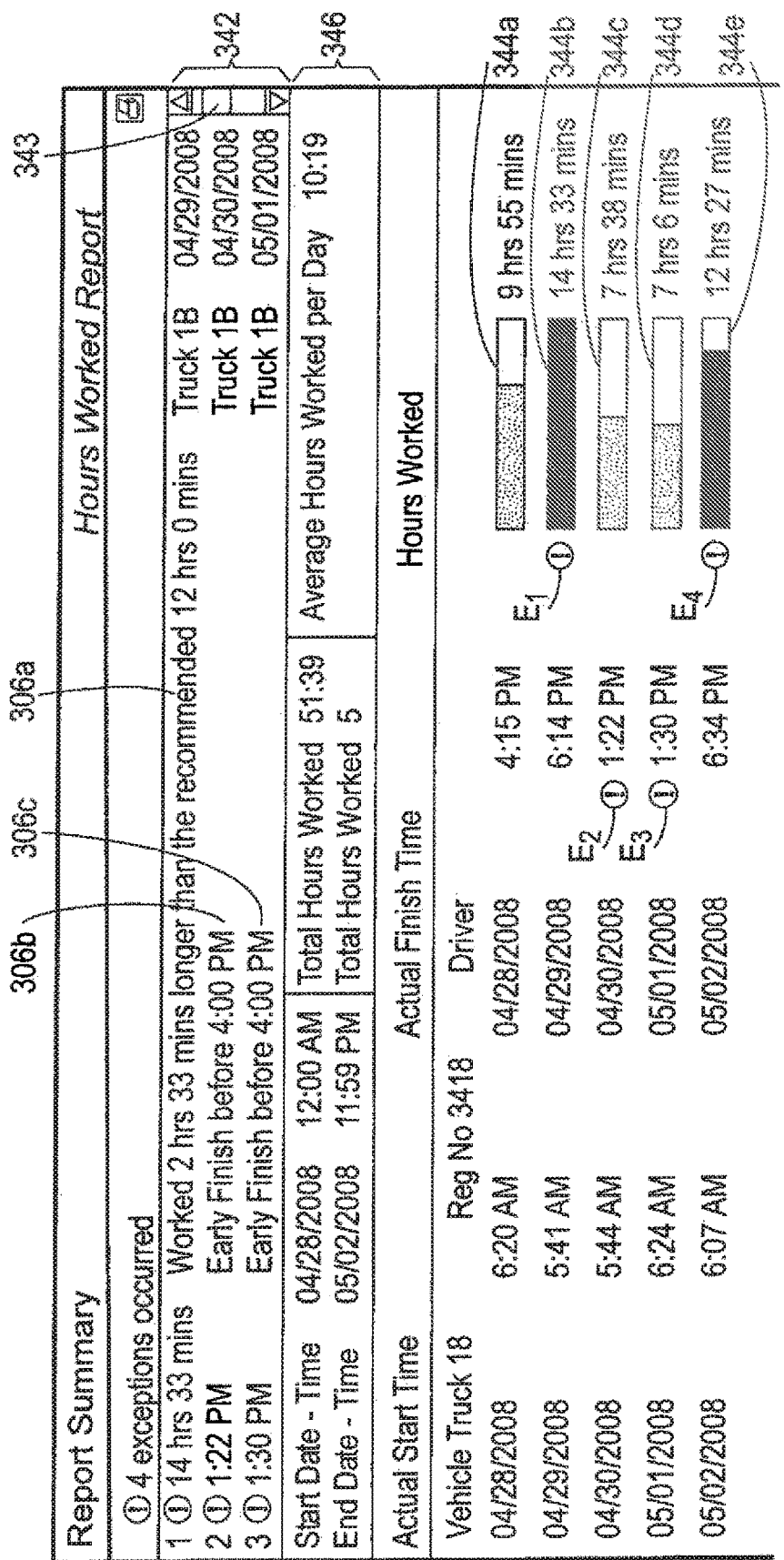
Figure 3C:
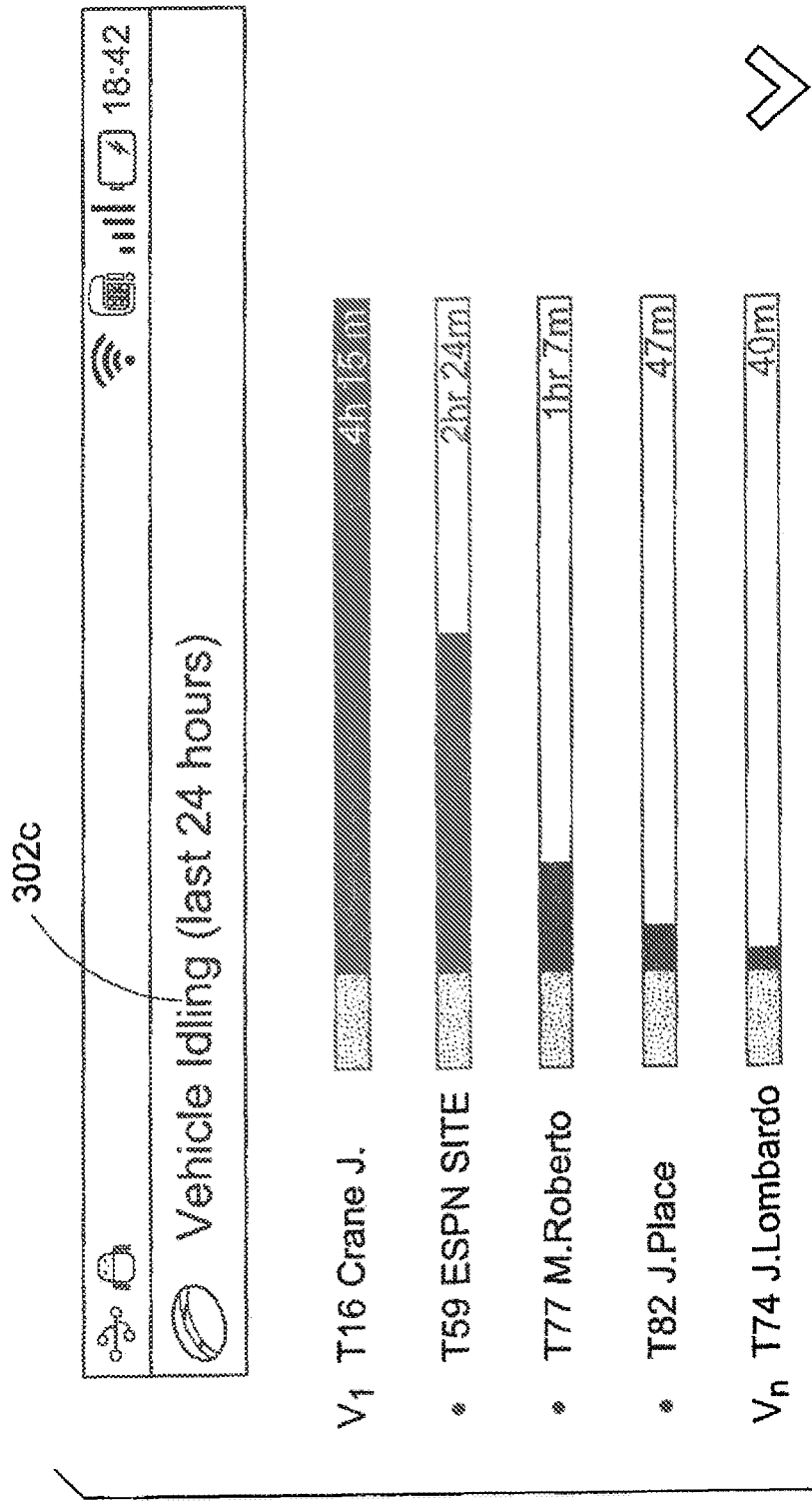

The "Distance Traveled" 335b reports and alerts are consistent with criteria for the "Vehicle Mileage" 302b for the individual driver described above, and ranks vehicles within the top 10 of the fleet from highest to lowest for distance traveled. A finable bar graph shows the predetermined threshold of 150 miles in the left-hand bar graph, which is in green. However, the left-hand of the bar graph shows, with fill lines by percentage, where the driver has exceeded the 150 miles threshold. The top ranked vehicle of the fleet is in excess of the threshold by 236 miles, whereas the $10^{th}$ ranked vehicle (Van 1026) is only a few miles over. A fillable bar graph shows distances times, with the 150 mile threshold being green any excess mileage being red so as to alert the user, with the fill line visually showing the percentage of the 300 mile distance. Text graphics write out mileage at or under 150 miles on the left-hand side, and mileage in excess right hand side. Again, rows of the bar graphs for each vehicle are aligned columnar format so as to readily compare each vehicle's statistics with one another. The "Idling" 305c and "High Speed" 306d reports graphics are similarly configured, thereby proving a user friendly view for all the metrics for the ranked vehicles and drivers in the fleet. For example, "Idling" 335c includes an alerting threshold of 1 hour, and reports, bar graphs, alerts for excess of an hour of idling. As shown in FIG. 3C, such a Idling report can also be configured in a format for delivery to a PDA or smartphone, which shows bar graphs, rankings, and idling times for a plurality of drivers/vehicles over a 24 hour period. Returning to FIG. 3B, as with the individual report 302 above, speeding 335d includes bar graphs, reporting and alerting for, among other things, speed in excess of 70 mph, 80 mph, and 90 mph, with different colors for each (e.g. green, yellow, and red).

More detailed reports can be created and configured. FIG. 3B shows one example of a detailed report for an employee and vehicle, as could be accessed, for example, in a page for reports (see FIG. 3A 322). The report is an "Hours Worked Report" 350 for a vehicle (Truck 18) over a five day workweek, as shown in the lower table 340 portion of the graphic user interface 340. Each day of the work week is given a row 340a, 340b, 340c, 340d, 340e on the report, and the table 340 which includes columns for day, start time, driver, finish time, and an "Hours Worked" bar graph 344a, 344b, 344c, 344d, 344e which shows a colored fill bar and text showing the hours worked. The report has alerting icons E1, E2, E3, E4, which show exceptions where a vehicle and driver have exceeded predetermined thresholds or criteria. The exception alerts are described in an upper window 342, which can be scrolled using a scrolling graphic 343 using a mouse, via touch screen, or other input. The upper window 342 reports and alerts the user as to the exceptions, which reports two alerts 306b, 306c that on 2 days a driver finished at 1:22 pm and 1:30 p.m., which is before predetermined time (before 4:00 p.m.). Another alert 306a shows that on one day the driver worked two hours longer than a predetermined time period (12 hours), as the driver worked 14 hours and 33 minutes. By scrolling down the upper window module 342, the user can see the fourth alert for the exception E4, where the driver exceeded the predetermined threshold of 12 hours by 27 minutes. The fill bars on the bar graphs 340a, 340b, 340c, 340d in the lower table 340 can also be colored to reflect an alert, such as where on days where a driver has exceeded the predetermined threshold for hours worked E1, E4. For example, the fill bar 344b, 344e can be colored red when the predetermined threshold is exceeded, whereas when under the threshold, the bar 344a, 344c, 344d is colored green. A week summary portion 346 of the graphic user interface 350 can give over all statistics for the week, such as start and finish dates and times, total hours and days, and average hours per day.

Figure 3D:
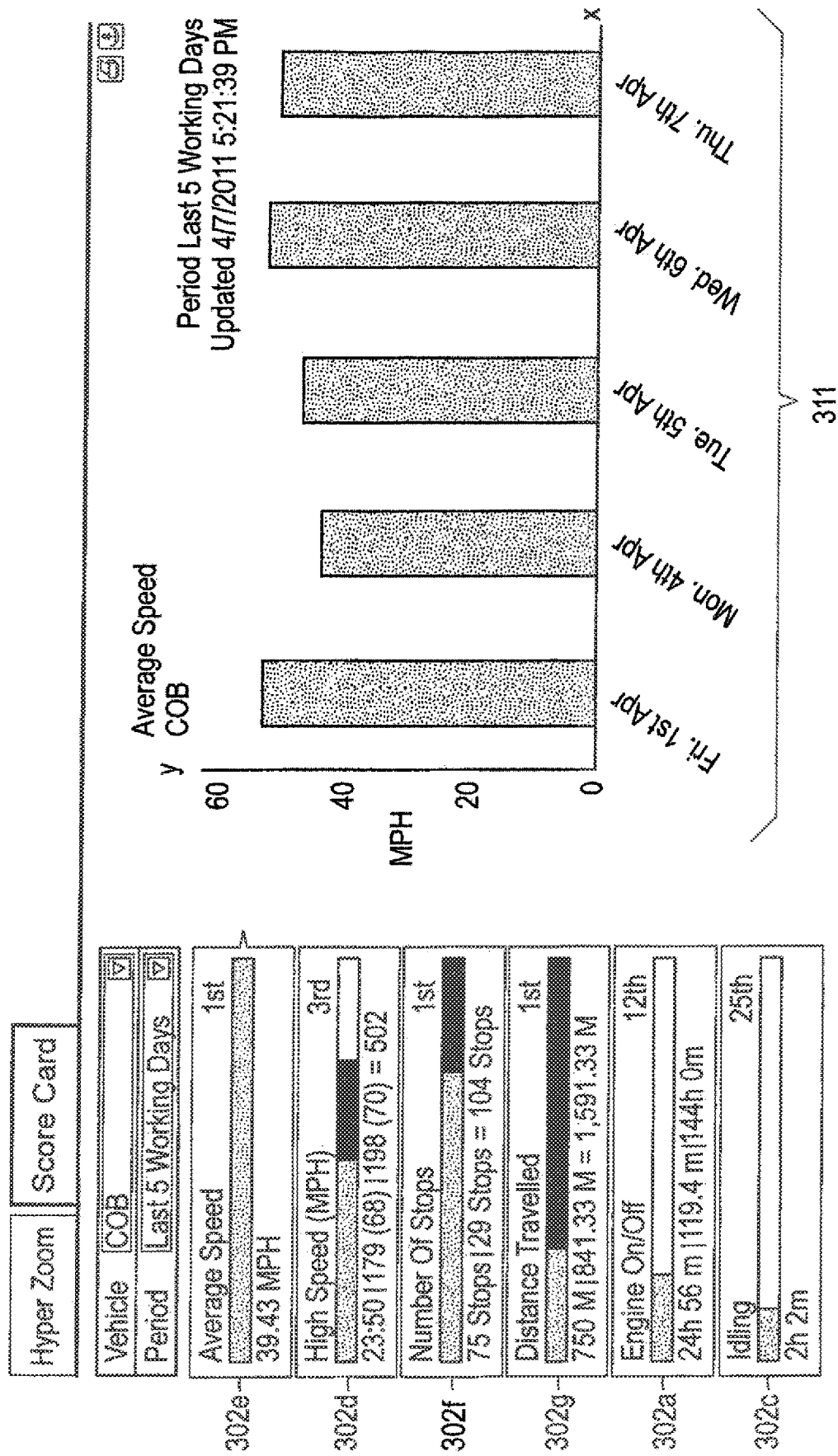
Figure 3E:
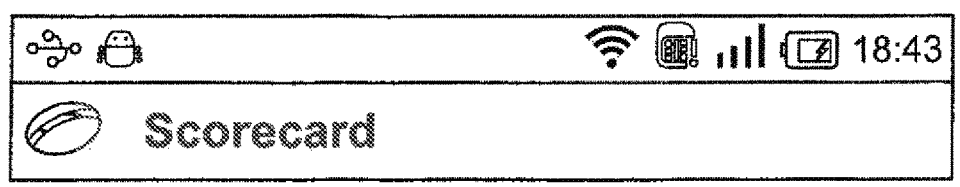

FIGS. 3D-3E shows another example of a detailed report for an employee and vehicle, shown as a "Scorecard" for a driver. As shown in FIG. 3D, a left hand graphic 307 includes fillable bars like those in FIG. 3A that show, for a driver, a score card for operational metrics Average Speed 302e, Distance Traveled 302g, Engine On/Off 302a, Vehicle Idling 302c, High Speed 302d, Number of Stops 302f, and Average Speed 302e for the individual driver. A ranking for each metric as compared to other vehicles in the fleet is also given. The GPS data analysis is given for a time period of 5 days. On a right-hand graphic 311, a bar graph shows, for each day of the 5 days, an average speed, where the X-axis has each day, and the Y-axis shows miles per hour (0-60 mph). FIG. 3E shows a scorecard graphic configured for an application for a PDA such as a smart phone, similar to the left-hand graphic 307, showing a score card for operational metrics 302a, 302g, 302c, 302d, 302f, 302e for the individual driver, as well as a ranking for each metric as compared to other vehicles in the fleet, for a time period of 24 hours.

Still other reports based on GPS data and tracking could be provided, such as driving behavior including vehicle speed, engine start-up and shut-down and idling time, or any others including as described herein which can be used to enforce driving policy and curb unwanted behavior like excessive speeding, tardiness and extended vehicle idling.

Similarly, alerts based on GPS data and tracking could be generated such as alerting a user immediately if a vehicle is used during off-hours, which can indicate a vehicle theft. Other exemplary alerts include late deliveries, vehicle care or maintenance is needed, or area reporting and/or need for rerouting. For example, alerts can be triggered for excessive speeding, excessive idling, engine start-up or shut-down during off-hours unauthorized vehicle usage and when a vehicle enters or exits specific geographic areas. Alerts can also be configured to alert when vehicles are due for scheduled maintenance (e.g., based on a specific length of time, miles driven, or engine-on time). Alerts can also be segregated from reporting on a separate page of a graphic user interface (e.g. accessible by a tab 328 as shown on the Dashboard 328 at FIG. 3A).

Figure 3F:
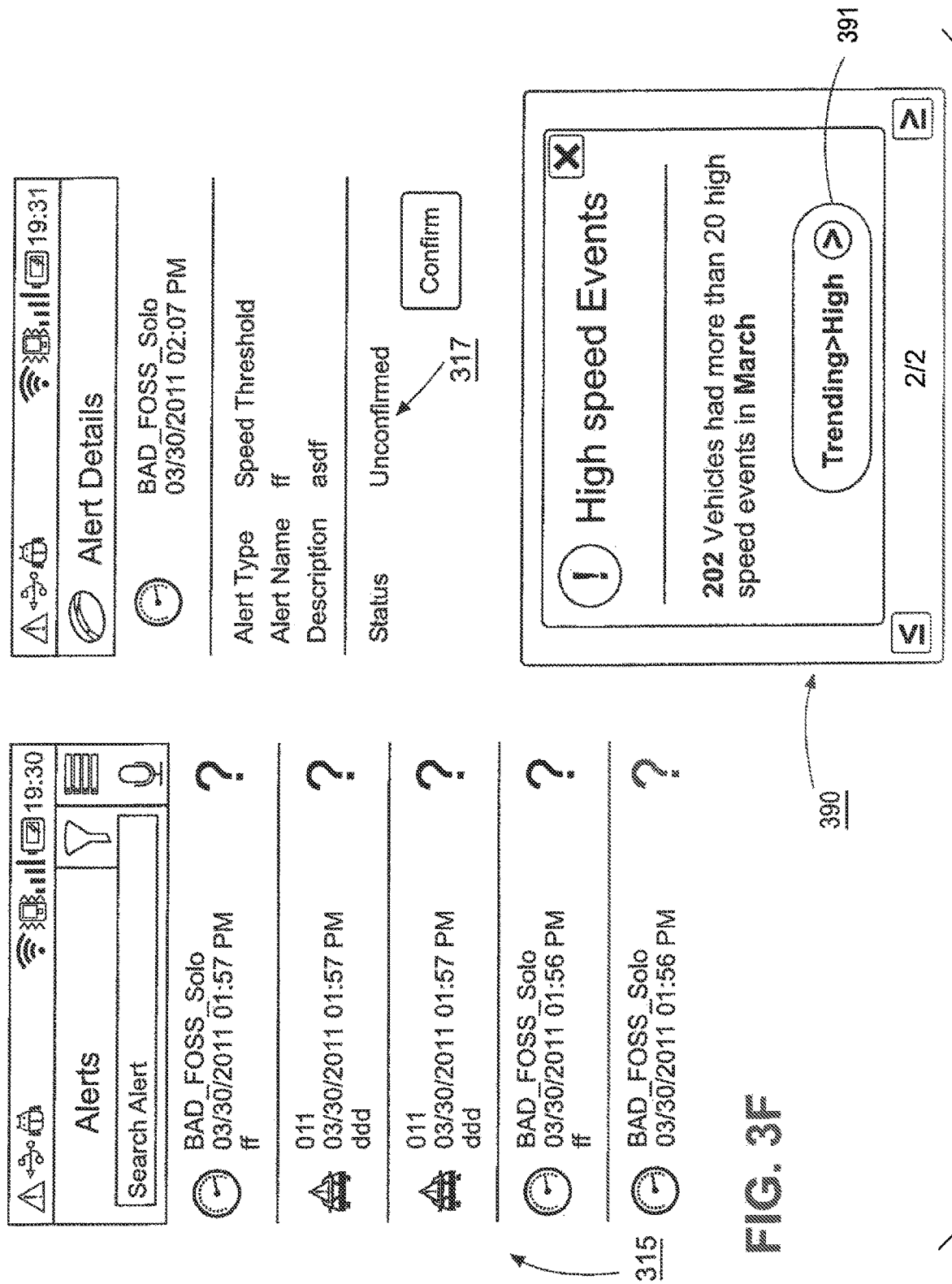

Alerts can be flagged in relevant reports as shown above, and users can also be notified of any alerts as soon as a violation occurs via email or mobile device. As shown in FIG. 3F, it will be noted that in some embodiments, a portable device such as a smart phone or PDA can be configured to receive alerts that need urgent attention, such as an off-hours use alert or an alert indicating rerouting is needed. For example, as shown, an application is configured to show a number of alerts 315 received over a course of time, including for example, alerts showing a speed criterion or threshold has been met or exceeded. By selecting one of the alert indicators, a separate details screen 317 is accessed which describes the alert. Reports or alerts can also be configured to show fleet alerts 390 for a fleet trending data 390, as described below.

As explained above, the computer system includes GPS event database. The GPS event data is analyzed to derive a plurality of operational metrics for each of a plurality of vehicles; and identify, from the analysis, at least one trend for a GPS event history using the GPS event data. The system can be configured to provide to a graphic user interface an interactive display configured display a representation (e.g., a graphic presentation of the trend). Reports and alerts based on GPS data and tracking and trending is provided, including for driving behavior including vehicle speed (including average speed and high speed), engine start-up and shut-down, idling time, number of stops or any others including as described herein which can be used to enforce driving policy and curb unwanted behavior like excessive speeding, tardiness and extended vehicle idling.

Figure 12B:
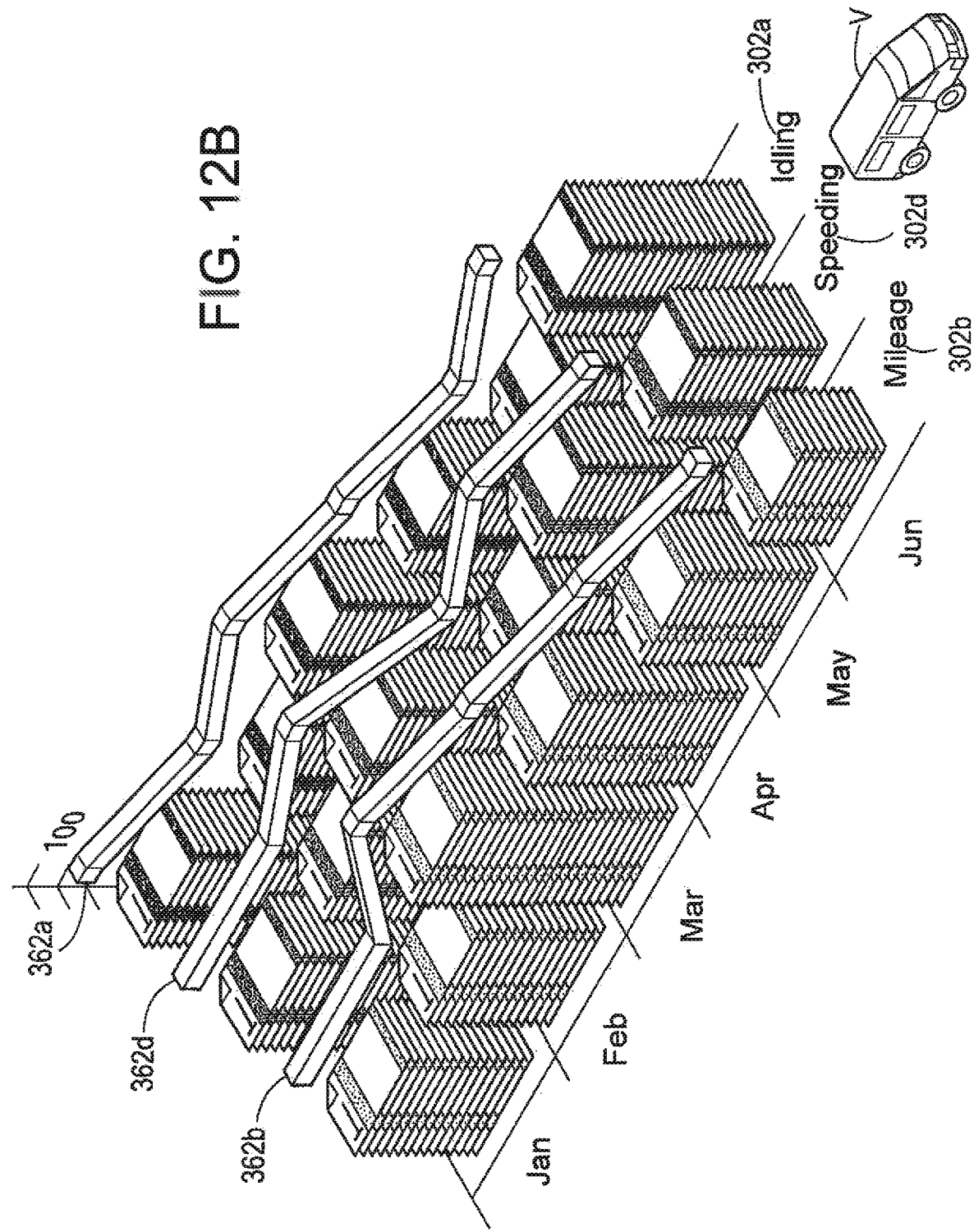

FIGS. 12A-12C shown a graphic flow for analyzing received GPS event data and GPS data stored over time to identify, report, and display trending. As shown in FIG. 12A, GPS event data for each vehicle, as described herein, is gathered over a period of time. The data is analyzed for over time (shown over 6 months) derive operational metrics 302, for example, mileage 302b, speeding, 302d and idling 302a. Such data can be analyzed for each month to identify statistics for each operational metric, for example, for each vehicle or employee, as well as to derive statistic for the fleet (e.g. averages under each operational metric, or averages for defined groups under each metric). Such data can be collected and stored indefinitely.

As shown in FIG. 12B, the analyzed historical event data for each operational metric 302 shows trend data 362, for example, the performance of a vehicle/driver v over the 6 month period, for example, a mileage trend 362b, a speeding trend, 362d and an idling trend 362a for each month. As shown in FIG. 12C, the trend data 362 for each operational metric can then be extrapolated from the GPS event data. This trend data is extrapolated for each vehicle in a fleet, as well as for each employee, and can be used in conjunction with other databases to provide trending and statistical data as described herein. Trend data includes not only the direction in which performance and behavior move under operational metrics, but also identifiable changes in those movements and comparisons therebetween, as well as statistical data drawn from GPS data and other databases, as described herein.

Figure 3G:
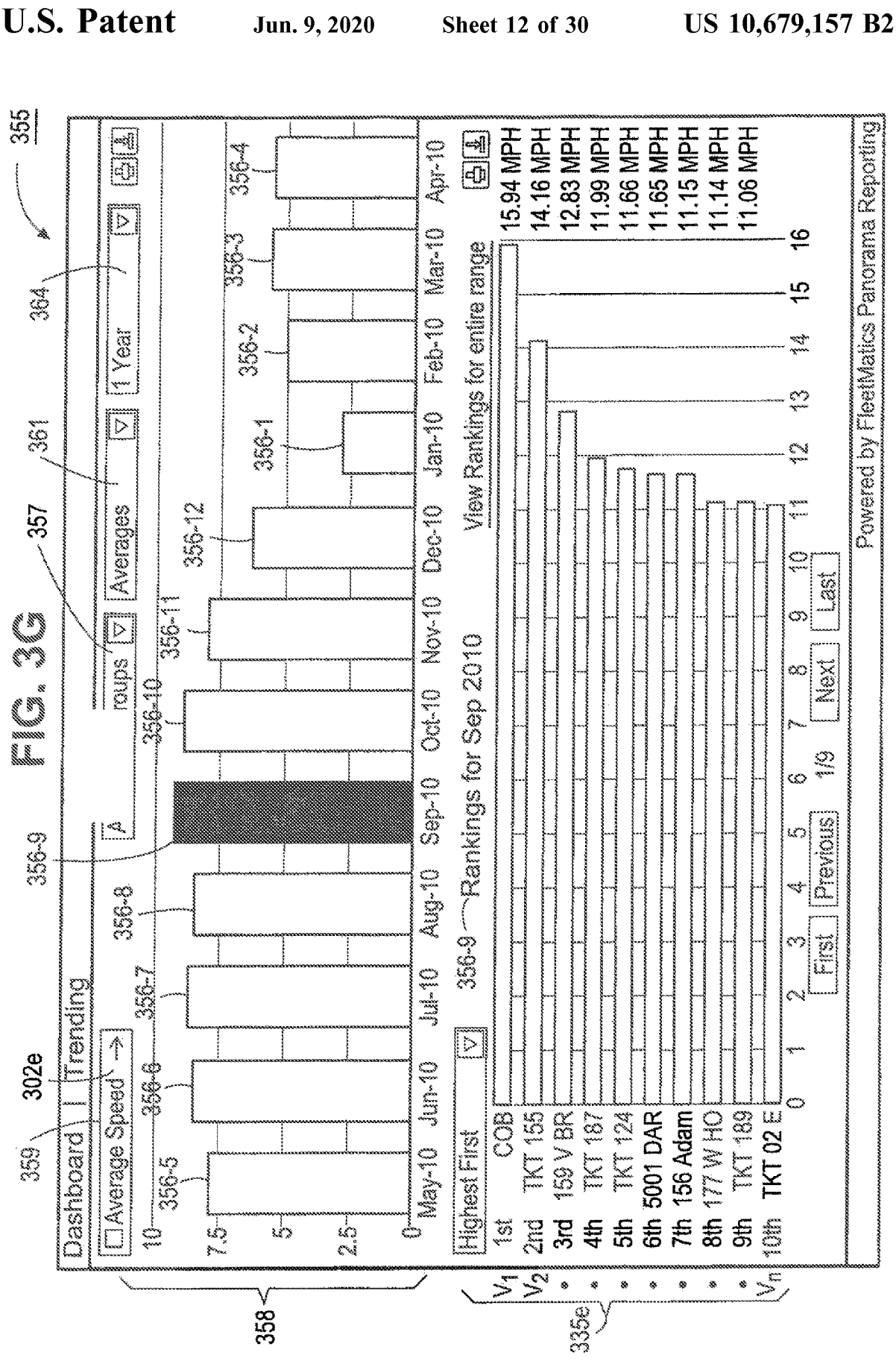

FIG. 3G shows one example of a detailed trend report 355 for a fleet and employees from trending analysis as described above. As shown, a "Trending" page could be accessed, for example, in a page from the "Dashboard." The trending 355 is an "Average Speed" report 355 for the average speed 302e for at least one fleet group 357 over a time period 364, for example 3 months, 6 months, a past year, a selectable year (e.g. 2010, 2011) or "all" (e.g. a full time period for which data was collected for a given user). It will be noted that the time period available to a given user depends on how much GPS event data stored for the fleet for that user. For example, a user whose fleet data is collected starting Jan. 1, 2011 would not have options for data before that time.

A drop down menu 359 is configured to allow a user to select any number of operational metrics 302 as described herein, for example: Average Speed 302e, Distance Traveled 302g, Engine On/Off 302a, Vehicle Idling 302c, High Speed 302d, Number of Stops 302f, or Average Speed 302e. While a fleet group 357 is shown as "all fleet groups," fleet group can include any subset of vehicles, and can be configured to allow a user to set up custom groups a fleet. For example, a user may have fleets for different geographical locations (e.g. a Bronx Fleet, Brooklyn Fleet, Queens Fleet, a New Jersey Fleet, a Dublin Fleet etc.) then the groups can be so defined. GPS data can then be filtered and analysed for this group for vehicles within in the group selected in the manner described above. The system can also be configured to permit a user to view the type of statistical data within the operational metric For example another drop down menu 364 allows a user to select either "Averages" or "Totals." The graphs represent can represent either totals across the fleet or subset selected, or non-zero averages across the fleet. A non-zero average discounts, for example vehicles who had no data for the period, e.g. for fleets who have added new vehicles or decommissioned vehicles periodically in their contract.

As shown in a graph 358 in a top portion of the user interface 355, a fleet report for all vehicle groups 364 breaks down the average speed for all vehicles in a fleet for that year 364 by each month (May 2010 356-5, June 2010 356-6 . . . April, 2011 356-4). As shown, the months are along and x-axis whereas the speeds (from 0-10 mph) are along a y-axis. Each of the bars 356-5, 356-6 . . . 356-4 along the y-axis show average speed for each month. Bars 356 can be colored to convey information, for example, bar showing the month with the highest average speed 356-9 of about 9 mph, is a different color (e.g. blue) than the bars for the other months (e.g. green).

At the bottom of the trend report 355, a fleet report 335e similar to the fleet reports 335a, 335b, 335c, 3355d in FIG. 3A shows ranked speeds for the vehicles in the group 357 in the month with the highest average speed 356-9 in the graph 358 in a top portion of the user interface 35. Each vehicle v1, v2 . . . vn is ranked from highest to lowest for that month, with bar graphs for miles per hour for each vehicle shown along the x-axis and rank from highest to lowest in along the y-axis. The display could be configured to allow a user to select any month for a breakdown.

The trend data can include operational performance against at least one criterion, the at least one criterion including a criterion selected from at least one of; a user-configurable criterion; a criterion derived from GPS event data; a criterion derived from data other than GPS event data; a criterion derived from traffic data; and a criterion derived from industry data. FIG. 3F shows at 390 another example of trend report and alert based on a trend analysis. As shown, a "Stories" 390 report shows that in a fleet of vehicles, 202 vehicles had more than 20 high speed events in a given month. As shown, the alert 390 shows, based on a criterion derived from the GPS event data, which shows that the Trending for the operational metric is high 391. While such a criterion can be derived from GPS event data from the fleet from that user, it can also be derived from non-GPS event data such as industry standard data derived from, for example GPS data of other users or external databases that hold data related to operational statistics.

Figure 3H:
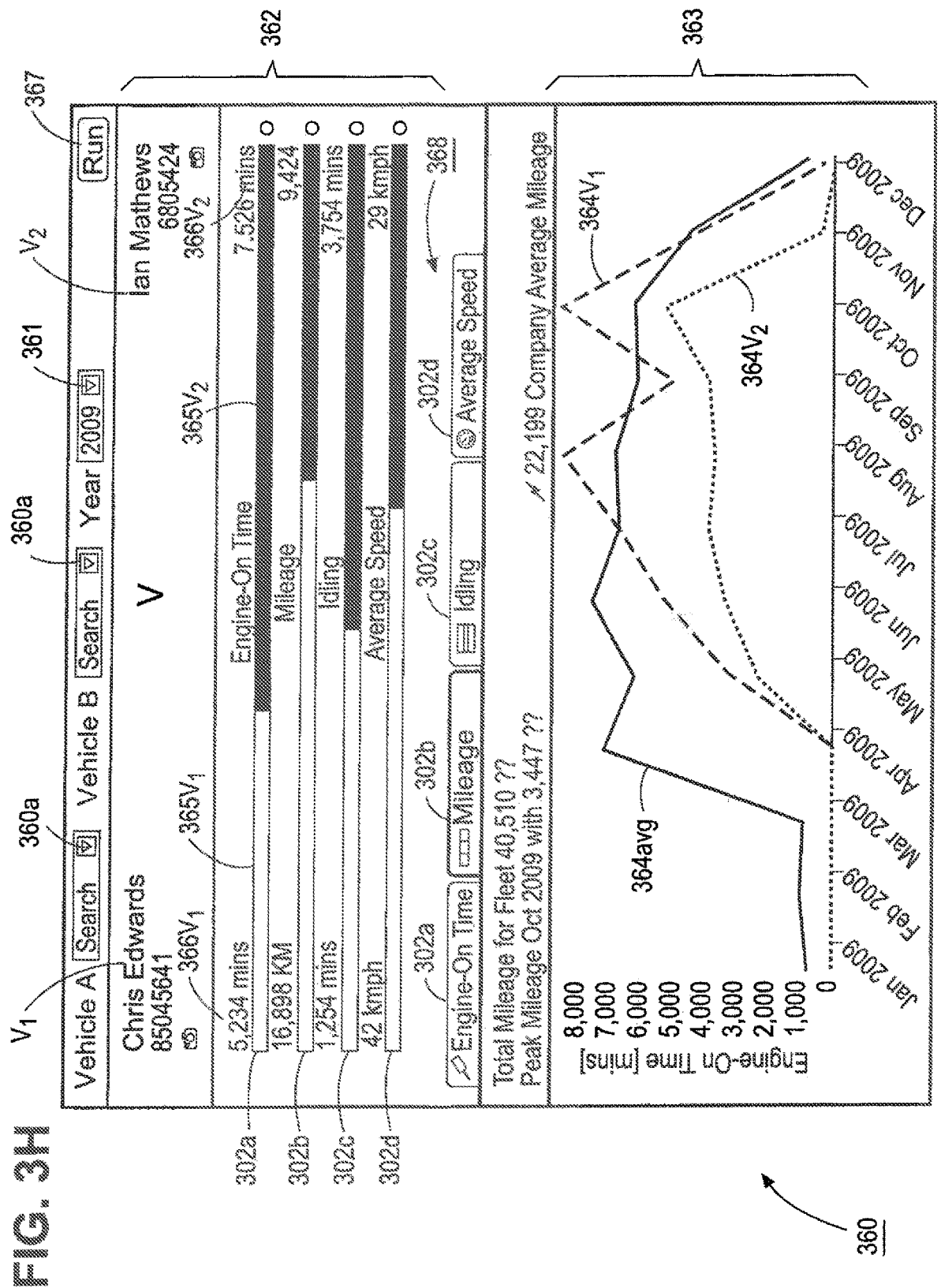
Figure 3I:
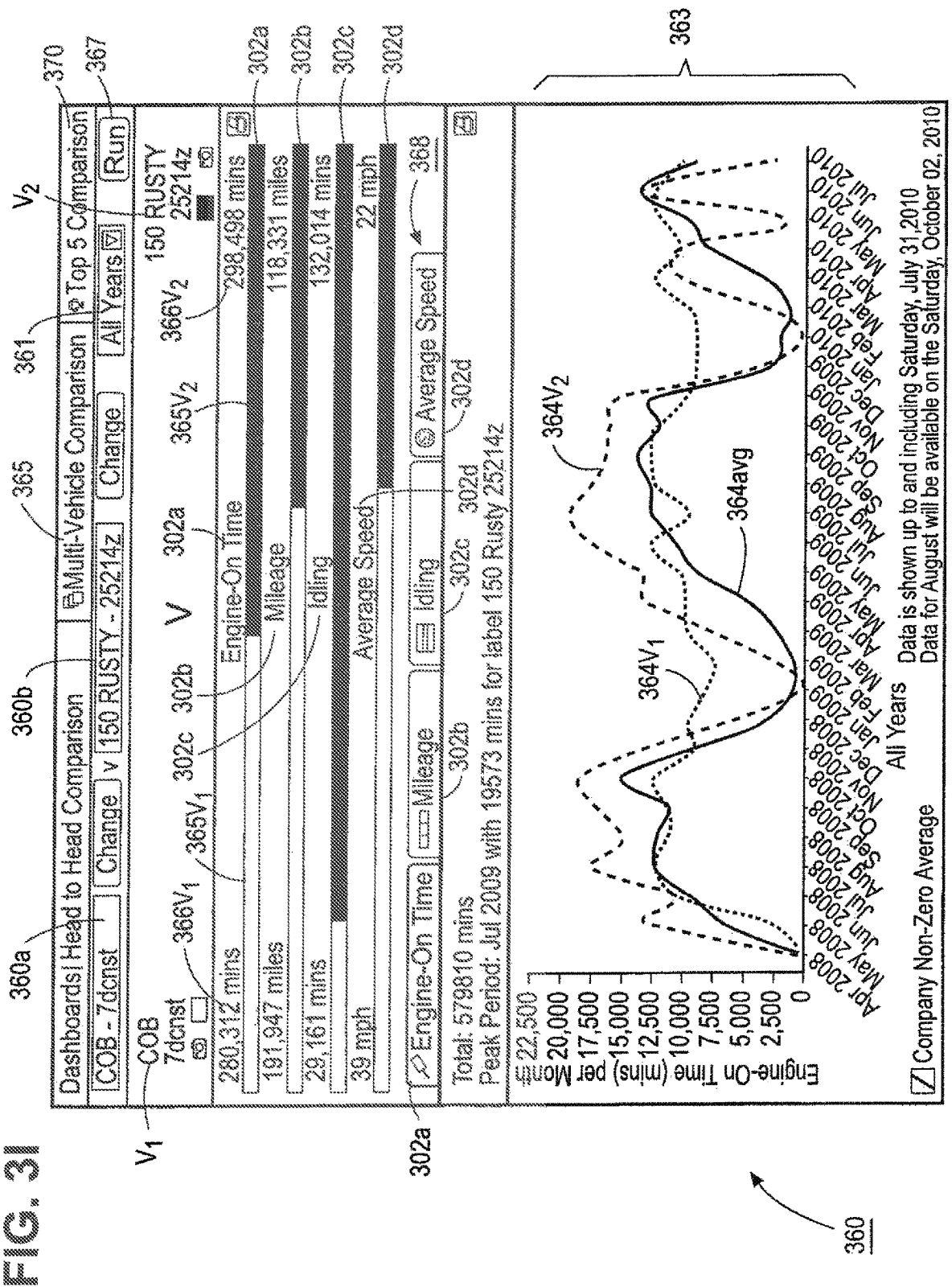

FIGS. 3H and 3I show other examples of a detailed trend report 360 for a fleet and employees from trending analysis as described above. The display shows a "head to head" analysis of two drivers v1, v2, each of which can be selected by drop down menus 360a, 360b, which can also be configured to be searchable. The head to head analysis can be selected using a drop down and/or searchable menu 361 for over any over a time period, for example 3 months, 6 months, a past year, a selectable year (e.g. 2009, 2010, 2011) or "all" (e.g. a full time period for which data was collected for a given user). Again, it will be noted that the time period available to a given user depends on how much GPS event data stored for each driver and/or vehicle. For example, a user whose fleet data is collected starting Jan. 1, 2011 would not have options for data before that time. Similarly, data would not be available for a given vehicle or driver for any time period where data was not collected from a GPS device associated with that user or driver. Once the vehicles v1, v2 and the time period are selected, a user can, via an input 367, run the comparison.

A top section 362 of the page shows a "versus" trend comparison, which presents graphics comparing each vehicles' v1 v2 performance under operational metrics 302 as described herein, for example: Engine On/Off 302a, Vehicle Mileage 302b, Vehicle Idling 302c and Average Speed 302e. As shown in FIG. 3H, each operational metric 302 includes a bar graphic 365, where the left-side 365v1 of the bar corresponds to one driver v1 and the right side 366v2 of the bar corresponds to another vehicle v2. A visual indicia for the bar, for example a color, is given for each driver v1, v2, which allows a user to readily compare performance trends and statistics under each operational metric 302 for each driver v1, v2 for the time period selected (e.g., 2009). A text graphic 366v1 may also give statistical trend data. For example, as shown in FIG. 3H, driver v1 has under "Engine-On Time" 302a, a green color on the left-side 365v1 of the bar that is not as long as vehicle 2's v2 red color on the right-hand side of the bar 365v2. Text graphics 366v1, 366v2 at the left and right hand extremes of the bar show respectively that driver 1's v1 engine-on time is 5,234 minutes 366v1, whereas driver 2's v2 engine on time is 7,556 minutes 366v2. In the example shown in FIG. 3I, driver v1 has under "Engine-Time" 302a, a green color on the left-side 365v1 of the bar that is again not as long as vehicle 2's v2 red color on the right-hand side of the bar 365v2. In FIG. 3I, text graphics 366v1, 366v2 at the left and right hand extremes of the bar show respectively that driver 1's v1 engine on time for all years is 280,312 minutes 366v1, whereas driver 2's v2 engine on time for all years is 298,498 minutes 366v2. The statistics are given in the same layout for Vehicle Mileage 302b, Vehicle Idling 302c and Average Speed 302e, thus allowing a user to readily see and compare how each driver v1,v2 performed for the time period selected (e.g. the year of 2009, "all years").

A bottom section 363 of the page shows an XY graph which plots the statistics for each driver in increments for the "versus" trend comparison. Page tabs 368 for the graph report 363 allows the user to see XY graphs 363 for each of the operational metrics Engine On/Off 302a, Mileage 302b, Vehicle Idling 302c and Average Speed 302e. As shown in FIG. 3H, Mileage 302b for a year is presented, whereas in FIG. 3I, Engine-On Time 302b for "all years" is presented. In FIG. 3H, along the X-axis are increments of months, and along the Y-axis is vehicle mirage in 1000 mile increments. In FIG. 3I, along the X-axis are increments of years for "all years", and along the Y-axis is Engine-On time in minutes per month. Each driver v1, v2, has a bar graph 364 v1, 364v2 plotted along the XY axis showing their individual performance over time. A visual indicia for the bar, for example a color, is given for each driver v1, v2, which allows a user to readily compare performance trends and statistics for the operational metric 302 for each driver v1, v2 for the time period selected, and can be configured to correspond to the colors assigned to each driver in the top portion 362 of the report.

Also, one or more trend bar graphs can be added to show a comparison for at least one criterion, for example a criterion selected from: a user-configurable criterion; a criterion derived from GPS event data; a criterion derived from data other than GPS event data; a criterion derived from traffic data; a criterion derived from traffic data; and a criterion derived from industry data. For example as shown in FIGS. 3H and 3I, a fleet average bar 364avg shows a fleet average performance for the operational metric 302 selected (e.g., Vehicle Mileage in FIG. 3H, Engine-On Time in FIG. 3I). Accordingly, a user can readily see a comparison of the selected drivers v1, v2 against one another, but also as against the selected criterion or criteria. In another embodiment (not shown), the criterion can be drawn from industry data as described herein, and the representation of the trend can be, for example, graphic presentations such as a bar graph shown showing performance against an industry benchmark derived from the industry data (e.g. industry averages for operational metrics, best-of-class industry averages, goals met/unmet vs. industry standards). For example, a graph could show an average of the top percent of industry performers for which there is industry data. The screen could also shown goal benchmarks set by a user, as could be developed from industry data, and whether the vehicles or fleet are meeting those goals.

Figure 3J:
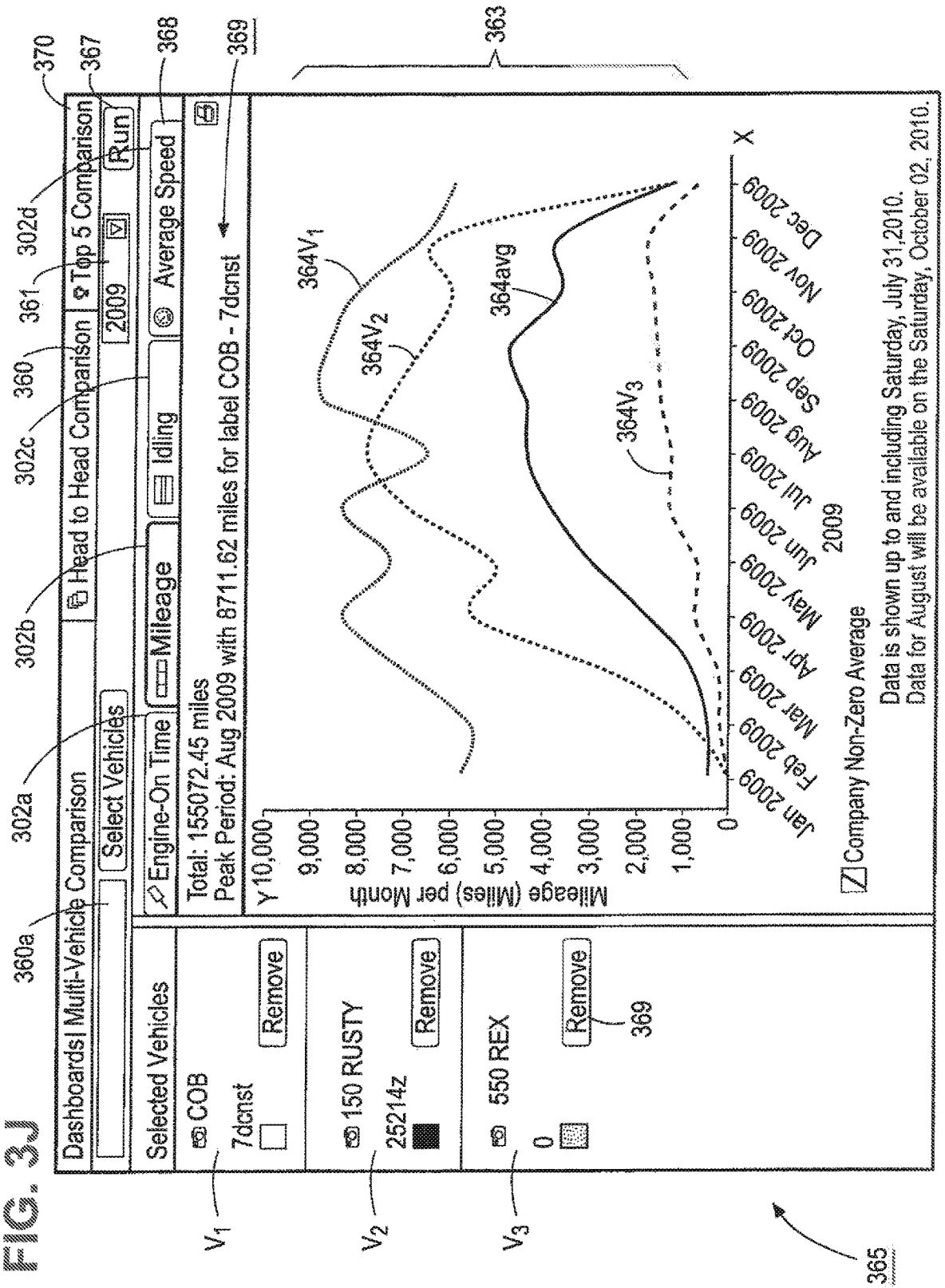
Figure 3K:
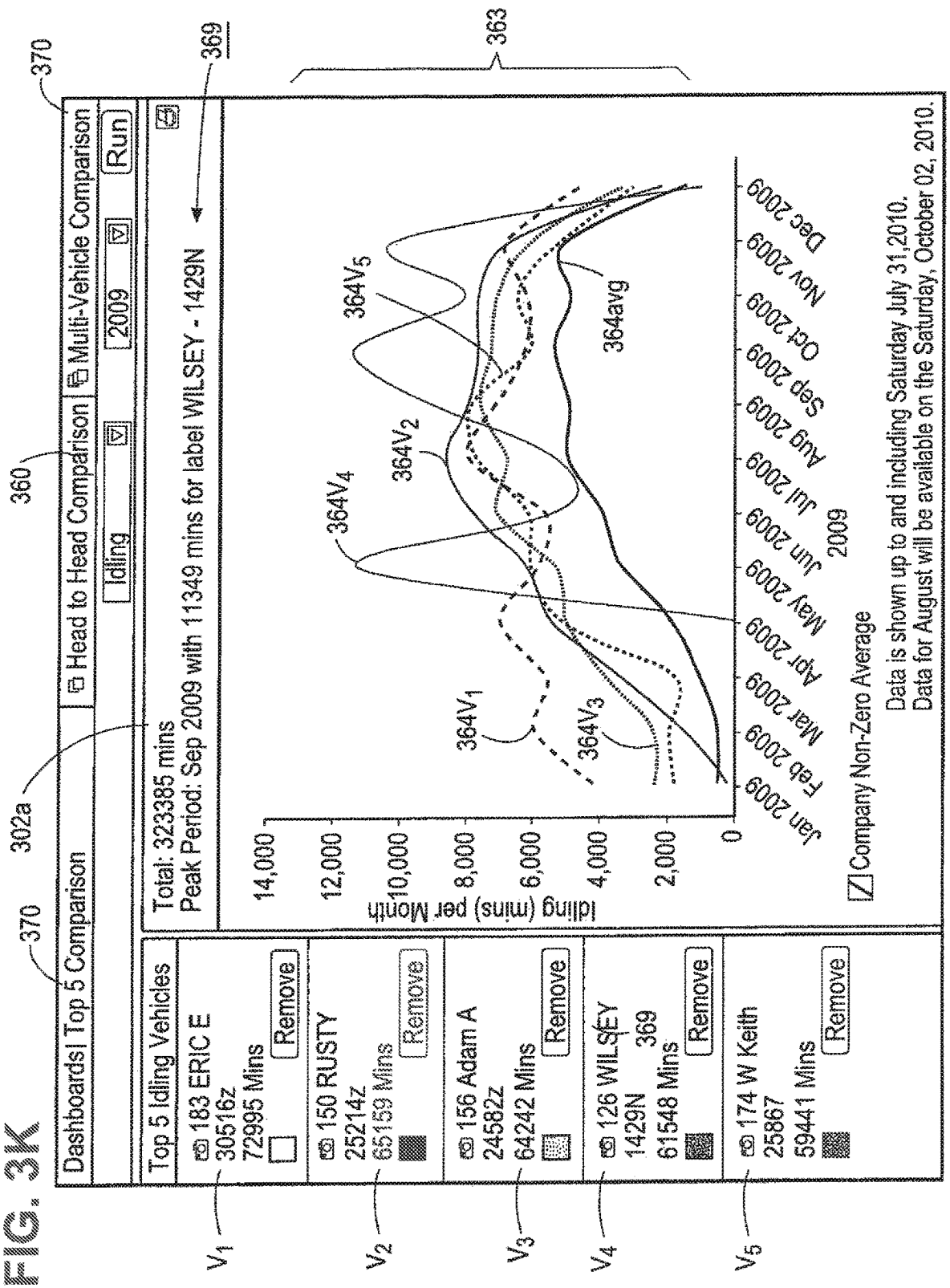

As shown in FIG. 3J and FIG. 3K, any number of vehicles or drivers v1, v2 . . . vn can be added to the graphics to permit comparisons as described above. For example, FIG. 3J shows a multi-vehicle graphic 365 where a user is presented with an XY axis 363 for the operational metric Mileage 302b for the year 2009, similar to those described above with respect to FIGS. 3H-3I, which includes an input area 360a for adding as many vehicles v1, v2, v3 . . . vn as a user desires.

As shown in FIG. 3J, 3 vehicles/drivers v1, v2, v3 are compared for the year 2009. In another embodiment, the system can be configured to analyse GPS data other criteria data (e.g., industry data) to allow for intelligent reporting. For example, as shown in FIG. 3J, a text graphic 369 also shows the totals for all vehicles selected, as well as a "Peak Period" which the month with the peak driving mileage (August 2009), as well as the monthly mile total for the vehicle/driver with the highest mileage that month (v1 with 8711.62 miles in August 2009). Thus the system thus shows trend data along with, for the drivers selected, the driver who was the largest cause. The system can be further configured to analyze the GPS event history for at least one driver's performance for at least one operational metric, identify a change in performance in at least one operational metric over a time period; provide, for the graphic user interface, the representation of the trend, the trend including a trend showing the change in performance for the operational metric.

FIG. 3K shows a multi-vehicle "Top 5 Comparison" graphic 370 where a user is presented with an XY axis 363 similar to those of FIG. 3H to 3J for the operational metric "Idling" 302c for the year 2009. The graph plots the minutes spent idling for the "top 5" vehicles v1, v2, v3, v4, v5 for the year 2009. As will be understood, the "top 5" may show either the least amount of minutes spent idling, which is a positive performing statistic, or the "top 5" could be configured to show those in the fleet with the highest minutes spent idling, which would be a negative performing statistic. A text graphic 369 also again shows the totals for the top 5 vehicles, as well as a "Peak Period" which the month with the peak idling time (September 2009), as well as the idling minute total for the vehicle/driver with the highest idling minutes that month (v4 with 11,349 mins. in September 2009). Thus the system thus shows trend data along with, for the top 5 drivers, the driver who was the largest cause.

In another embodiment, system can be configured to proactively generate reports or alerts based on, inter alia, analyses of GPS event data and non-GPS event data as described herein. The system can be configured to analyze the GPS event history for at least one driver's performance for at least one operational metric, identify a change in performance in at least one operational metric over a time period; provide, for the graphic user interface, the representation of the trend, the trend including a trend showing the change in performance for the operational metric. For example, in a current time period where GPS vehicle data is showing that an operational metric is trending above or below from a prior time period, the system can be configured to report and/or alert the user. For instance, in a current month where idling is up X % over the prior month, the system can be configured to deliver an alert showing the total idling for the present month and the vehicle(s)/driver(s) with the highest idling minutes that month, thereby pinpointing a cause. Similar alerts could be configured for any operational metric, (average speed, mileage, speeding, etc.) and for any time period (day, week, month, quarter, year, etc.) Comparisons could be run on other bases as well, for example, a delta for an operational metric from another time period (e.g., idling is up or down X % from the same month of the previous year, or the same week of the previous month, etc.) Such analyses can be performed for a single driver up to an entire fleet.

Criteria developed from GPS event data and non-GPS event data such as industry data or historical GPS event data can be used to develop criteria to configure such benchmarks. For example, where historical GPS data and/or industrial data show peak periods for certain operational metrics, a higher percentage threshold could be established before sending an alert than in a non-peak period. The system could also be adapted to incorporate goal benchmarks, and to alert a user when a driver is or is not meeting or exceeding benchmarks.

In another embodiment, the system can be configured to develop criteria using industry data from industry databases and/or historical GPS event data. For example, industrial and/or historical GPS data may show driver or fleet performance metrics and trends for given operational metrics. The system can be configured to facilitate a user in understanding and developing internal goals as against benchmarks developed from industrial and/or historical GPS data. For instance, the system could be configured to alert the user that it should set up an idling report for a given driver/vehicle, or that a mileage report should be set up for the fleet, based on the trending data from past performance.

In another example, the system could be configured to allow the user to set monthly fleet goals for a plurality of operational metrics. In setting each goal, the system could send a facilitating message, alerting the user as to how the goal compared against a criterion such as an industry benchmark from industrial data and/or a benchmark based on historical GPS event data. For example, a user enters a goal for the fleet in a goal entry field (not shown) of keeping average minutes per vehicle for idling in a peak month to 5000 miles. The system can be configured to access historical GPS data and industry data to compare that goal against industry benchmarks and send a facilitating message, such as: "Only X % of fleets keep average idling per vehicle under 5000 miles." Analysis of fleets and vehicles for that use can be filtered by any number of factors to target the goal-setting benchmarks, for example, by geographical region or other relevant filtering data. (e.g. state, city, zip code, service area, comparable cities), fleet size, types of vehicles (truck, car, vehicle class), operational period (year, month), type of business (food delivery, furnishings delivery, package delivery), and so on. The system can further be configured to allow such goal settings for fleet subsets or selected drivers.

As will be understood, as more GPS data events are accumulated, accuracy and options for reporting can become more robust as welt.

As explained above, any of the presentations above could be configured such that criteria trend graphics can be added to show a comparison for at least one criterion as described herein (e.g.: a user-configurable criterion; a criterion derived from GPS event data; a criterion derived from data other than GPS event data; a criterion derived from traffic data; a criterion derived from traffic data; and a criterion derived from industry data).

In one embodiment, the computer system is configured to identify a trend for at least one operational metric for a first period; provide a criterion for the operational metric; identify a trend for the at least one operational metric for a second period; compare the trend for the first period against the second period to identify a change of performance for the trend; and determine if the change of performance for the trend meets the criterion. For instance, a user could identify a trend of high idling (e.g. up 7%) for a given month, and set a criterion for idling. For example, the user may input a benchmark of reducing idling by 5%. The system could then analyze GPS data to identify the idling trend for the following month, and determine if the fleet idling is or is not meeting the 5% reduction. As will be understood, the data can be provided over any selected time period(s), per driver/vehicle, a select set of drivers, fleetwide, and for any operational metric, and so on.

Figure 4A:
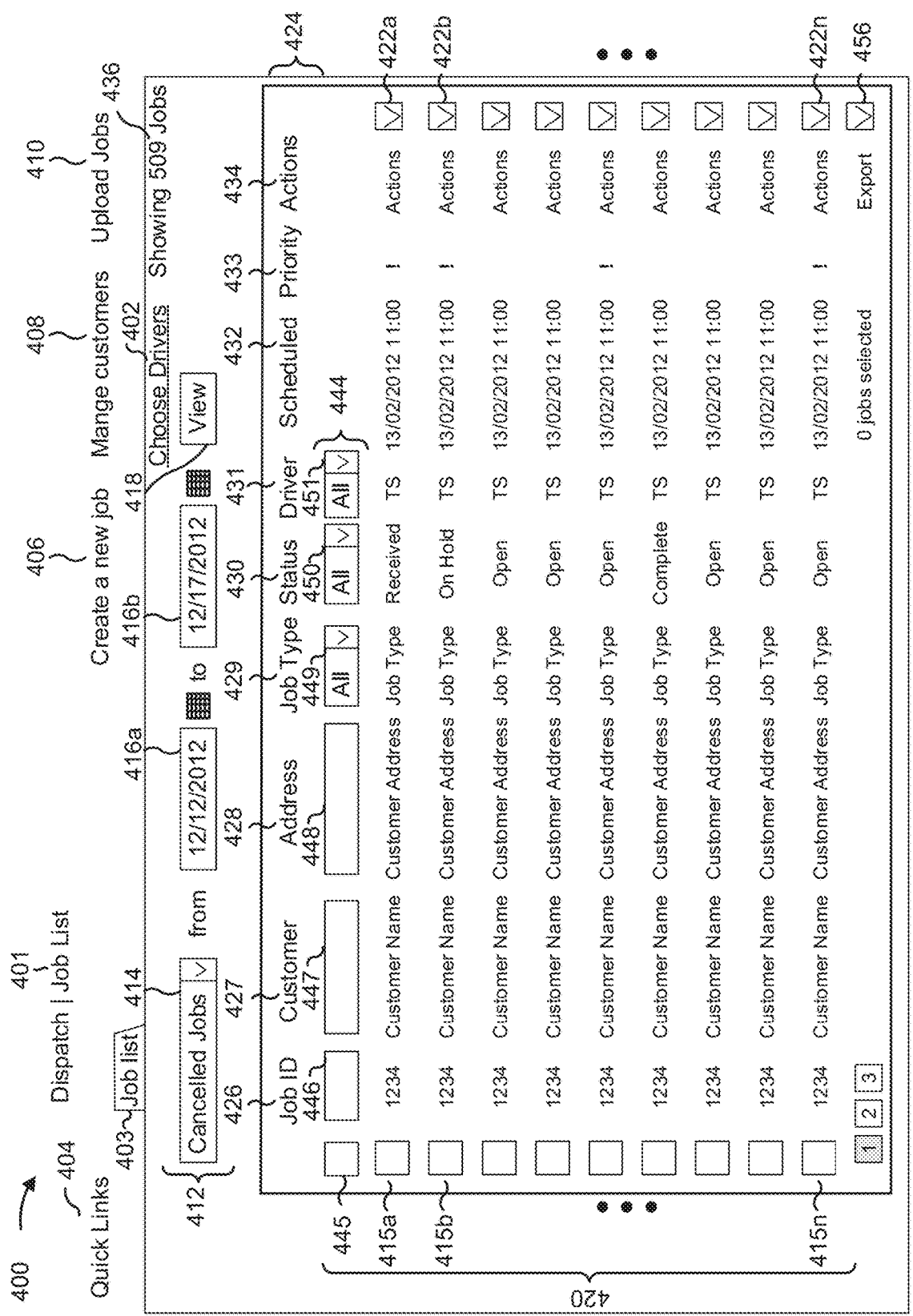
FIGS. 4A-4F depict exemplary representations of dispatch pages for graphic user interface.

FIG. 4A shows another example of an interface for a report for an employee and vehicle, as could be accessed, for example, in a page for dispatching vehicles to job sites. As described above, commercially available trading application that allows fleet owner to manage and direct fleet activity and performance like embodiments described is FleetMatics® FleetMatics GPS fleet tracking, which can be configured to accept and process GPS data from commercially available GPS device for dispatch. In various embodiments, the system is programmed work in conjunction with a system configured to provide a location and can also provide record of a route recorded by a GPS (Global Positioning System) device, for example, using an on-board unit which uses technology such as GPS to monitor a vehicle's positions and transmit wireless uploads to a central host system, as described herein. As shown in FIG. 4A, a user is presented with an interface 400 for viewing and managing current jobs, shown as a "Dispatch Tab (Job List)" 403. The interface 400 includes a screen which displays a number of management tools, including the following features:

A "Dispatch|Jobs List" page tide 401.

A "Choose Drivers" 402 (text link) provides an entry region that can be selected by an input device such as a mouse, which when selected it will open a multi-select filter. The system is configured to load a list of drivers, which the user can select. The system can further be configured such that if there are drivers selected when the filter is closed, then link will display as: "7 Drivers Selected (x)" with an input to clear the list, e.g. a "clear/delete icon."

In an embodiment higher level or more frequently used features can be included in a easily accessed or visualized area, such as a "Quick Links" 404 region. As shown in the embodiment, the Quick Links 404 includes selections for "Manage Customers 408," "Create a New Job" 406, and "Upload Jobs" 410. As will be understood, other features could be moved in or out of the easy access area, and further could allow such features to be moved either at the system administrator level or higher, or at a user level.

One option for presenting the list of jobs comprises a page 400 that can be configured to allow a user to apply filter criteria for the job dispatch. As shown in FIG. 4A, the system is configured to enable a user to access the job listing via a "Job List" 403 tab, which includes a table 420 that lists the jobs. The table includes rows 415a, b . . . n for each job, and columns listed under column headers 424 for Job ID 426, Customer Name 427, Customer Address 428, Job Type 429, Status 430, Driver, 431 Scheduled time of arrival 432, Priority 433 and Actions 434, which are described in more detail herein.

The page 400 also includes a job list criteria selection region 412 for selecting the criteria for the jobs list display 420. A "Date" area 416 loads results based on selected date. The system can be configured to default to the current date, however the area 416 allows a user to select a date range via selection entry areas 416a, 416b as described below. The job list criteria selection region 412 also includes an input entry "View" 418 configured to allow a user to load the selected jobs list once the criteria are selected.

Figure 4B:
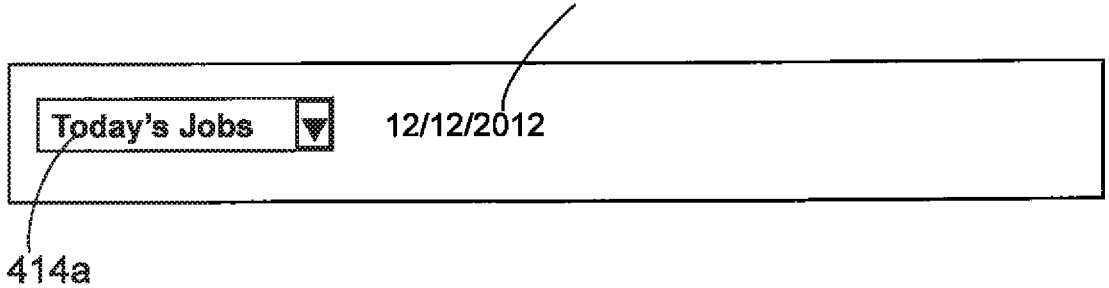

A jobs dropdown 414 allows a user to select from a predetermined list of options for the types of jobs the user desires to view. The dropdown features the following options, as follows:

As shown in FIG. 4B a "Today's Jobs" 414a feature loads all active jobs on the system and any closed, completed or cancelled jobs which status changed that day. In an embodiment this option can be a default, however other defaults or no default could be configured as well.

Figure 4C:
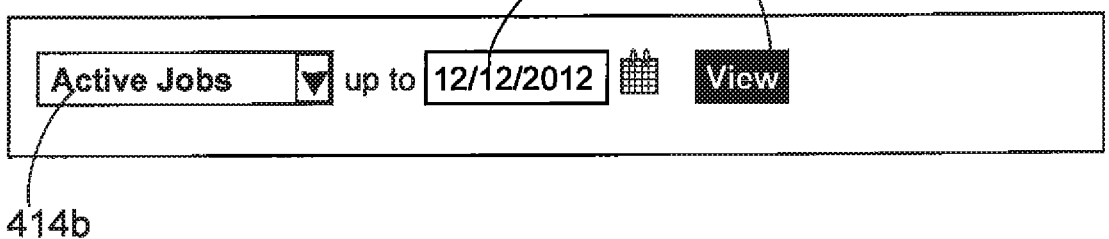

As shown in FIG. 4C, an "Active Jobs"414b feature from the dropdown 414 causes another field to load, shown as a selectable date field 416a. The "[Active Jobs 414b] up to [date field] 416a (NB)" are active jobs loaded based on a scheduled time and include that days current jobs and any older jobs. Although the date field 416a defaults to the current day, the date field 416a allows a user to select any day, whereupon the system is configured to load all active jobs until that selected day. The input entry "View" 418 allows a user to load the selected jobs list once the criteria are selected.

Figure 4D:
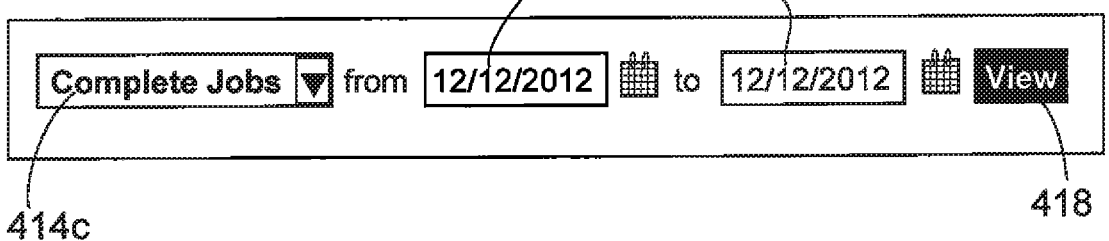
Figure 4E:
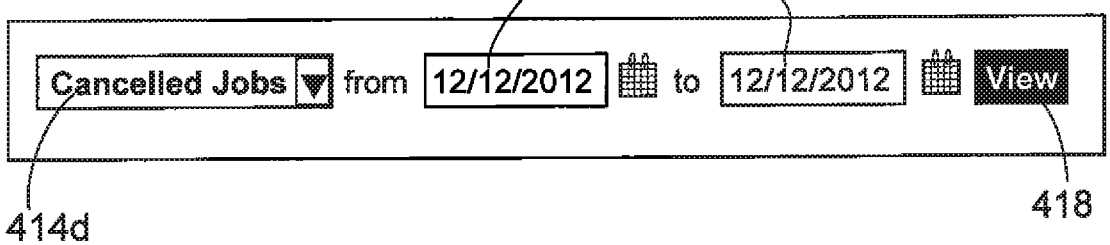

As shown at FIG. 4D a "Completed Jobs" 414c feature also loads second date field 416b, shown as loading to the right of the first date field 416a: "Completed Jobs" 414c from a date field 416a up to "date field" 416b. FIG. 4D shows a "Cancelled Jobs," 414d feature which loads the field: "Cancelled Jobs 414d from "date field" 416a up to "date field" 416b." The input entry "View" 418 allows a user to load the selected jobs list once the criteria are selected.

As noted above, FIG. 4A shows the system is configured to enable a user to access the job listing via the "Job List" 403 tab, which includes the table 420 that lists the jobs. The table includes rows 415a, b . . . n for each job, and columns listed under column headers 424 for Job ID 426, Customer Name 427, Customer Address 428, Job Type 429, Status 430, Driver 431, Scheduled time of arrival 432, Priority 433 and Actions 434, which are configured to act as filters for the job list 420. Also included is a "Check Box" 445 column where each job listing 422a . . . n can be selected with a user input (e.g. mouse click, touch, or keystroke) for the interface. In an embodiment where the job list is displayed as multiple pages, choosing a "Select All" check box can select all jobs and not just the ones on the particular page displayed to a user.

The job list 420 can be ordered by column heading 424, which order is maintained when a filter is applied for that column 424. The filters can be configured to always be displayed. A filter region 444 includes a number of filtering features which are configured to filter the columns 424 of the job list table 420. As described above embodiments, filters can include:

Job ID 426—text box input field 446
Customer 427—text box input field 447
Address 428—text box input field 448
Type 429—dropdown menu 449
Status 430—dropdown menu 450
Driver 431—dropdown menu 451
Scheduled Time 432—not searchable, and
Priority 433—not searchable.

For example, a dropdown "Job Type" menu 449, dropdown "Status" menu 450, and dropdown "Driver" 451 menu are each configured to allow a user to filter the job list by job type 429 as described herein, status of job 430, or driver for the job 431 respectively.

In an embodiment the Status 430 items can be configured to update without a page refresh being required. The system can be configured to show all types and statuses by default, or other default configurations can be designed. In the "Status" 430 menu 450, exemplary statuses can include:

1. Open
2. Received
3. Accepted
4. En Route
5. In Progress
6. On Hold
7. Complete
8. Closed
9. Cancelled
10. Return To Dispatch
11. Deleted (the system can be configured not to show deleted jobs display on the jobs list page).

The "Customer" name column 427 includes an input field 447 for allowing the ordering of the customer names. Similarly the Job ID 426, Address 428 and Job Type 429 columns have respective fields 446, 448, 449 for ordering the job list 400 accordingly.

A "Scheduled" 432 column shows the scheduled arrival times for each of the jobs 422a . . . n. A "Priority" 433 column gives an indication of priority of the job, for example using an alerting icon (e.g., an exclamation point, a colored icon, or any other graphic conveying a priority).

An "Actions" 434 item is configured to allow a user to take a number of actions for the job and job dispatch. A user can select an "Action" button 422a . . . n which loads a number of other options. Exemplary action items can include:

Find Nearest Vehicle—(loads a "find nearest" pop-up described below with respect to FIG. 5):
Re-assign
Recall
Complete
Cancel.

If job is identified as complete, further action options are "Closed" and "Re-open." If job is closed, the system is configured to present a "Reopen" option; in an embodiment "Reopen" is the only option for a closed job. If the job is open, but there is no driver assigned, further options can include: "Assign," "Complete," and "Cancel."

System configurations for an embodiment for when the "Action" is selected are described below. While the description is provided in terms of selecting and clicking on a buttons via a GUI input device such as a mouse, as will be understood, both here and throughout this disclosure, interfaces can be configured to operate with any input method as known in the art, including touch screens, keystrokes, and so on. The system is configured to allow a user to select the following actions:

Assign—this will assign the selected driver and return to main screen. If the current driver remains unchanged and the button is clicked, it will act the same as the cancel button—if a user selects this the main screen will grey out and a "Choose Driver" pop-up will load which lists all drivers for the fleet. Clicking a "cancel" button will close the pop-up and return to the main screen 400, having saved no changes. Clicking an "Assign" button assigns a driver selected from the driver list and return to main screen 400. If no driver is selected and the button is clicked, it will act the same as the "cancel" button. A user thus must choose a driver, click "cancel," or be cancelled by default; the system is configured such that a user cannot choose "no driver."

Reassign—if user a selects this, the main screen 400 will grey out and a "Choose Driver" pop-up loads, which lists all drivers for the fleet. Clicking on a "Cancel" button closes the pop-up and return to the main screen, having saved no changes, leaving the current driver unchanged. Selecting an "Assign" option, assigns a driver selected from the driver list and return to main screen 400. If no driver is selected and the button is clicked, it will act the same as the "cancel" button. A user thus must choose a driver or click cancel or be cancelled by default; the system is configured such that a user cannot choose "no driver."

Choose Driver—a "choose driver" can be configured as a dropdown menu that lists all drivers for a fleet, which the user can select.

Cancel—clicking this button will close the pop-up and return to the main screen 400, having saved no changes. The system is configured such that if a user selects this they will be shown a pop-up asking "Are you sure you want to cancel this job?" message and will have to select "Yes" or "No." A "Don't show me this message again" checkbox in the pop-up can also be included.

Close—The system is configured such that of a user selects this he or she will be shown a pop-up asking "Are you sure you want to close this job?" message and will have to select "Yes" or "No."

Recall—if the user selects this they will be shown a pop-up asking "Are you sure you want to recall this job?" message and will have to select "Yes" or "No." A "Don't show me this message again" checkbox in the pop-up can also be included.

Complete—if user selects this the main screen will grey out and a pop-up will load including an editable text "Price," which populates with whatever entry a driver has entered. A "Driver Note" editable text field can also be provided which populates with whatever text the driver has entered.

Reopen—The system is configured such that of a user selects a closed job on the main page and clicks "Reopen," the job status is updated as reopened. In the embodiment no pop-up is associated with this function.

In an embodiment, the system is configured to allow a user to select jobs, for example via a selection input area, shown as checkboxes 445$a$ . . . $n$, where the system can then display the number of jobs selected: "N jobs selected." The system can also be configured with an "Export" action button 456, which becomes active when one or more checkboxes have been checked. Clicking the export button 456 will load two options:

Excel—opens a CSV file in excel displaying the selected jobs, and

PDF—opens the selected jobs as a PDF for printing.

Figure 4F:
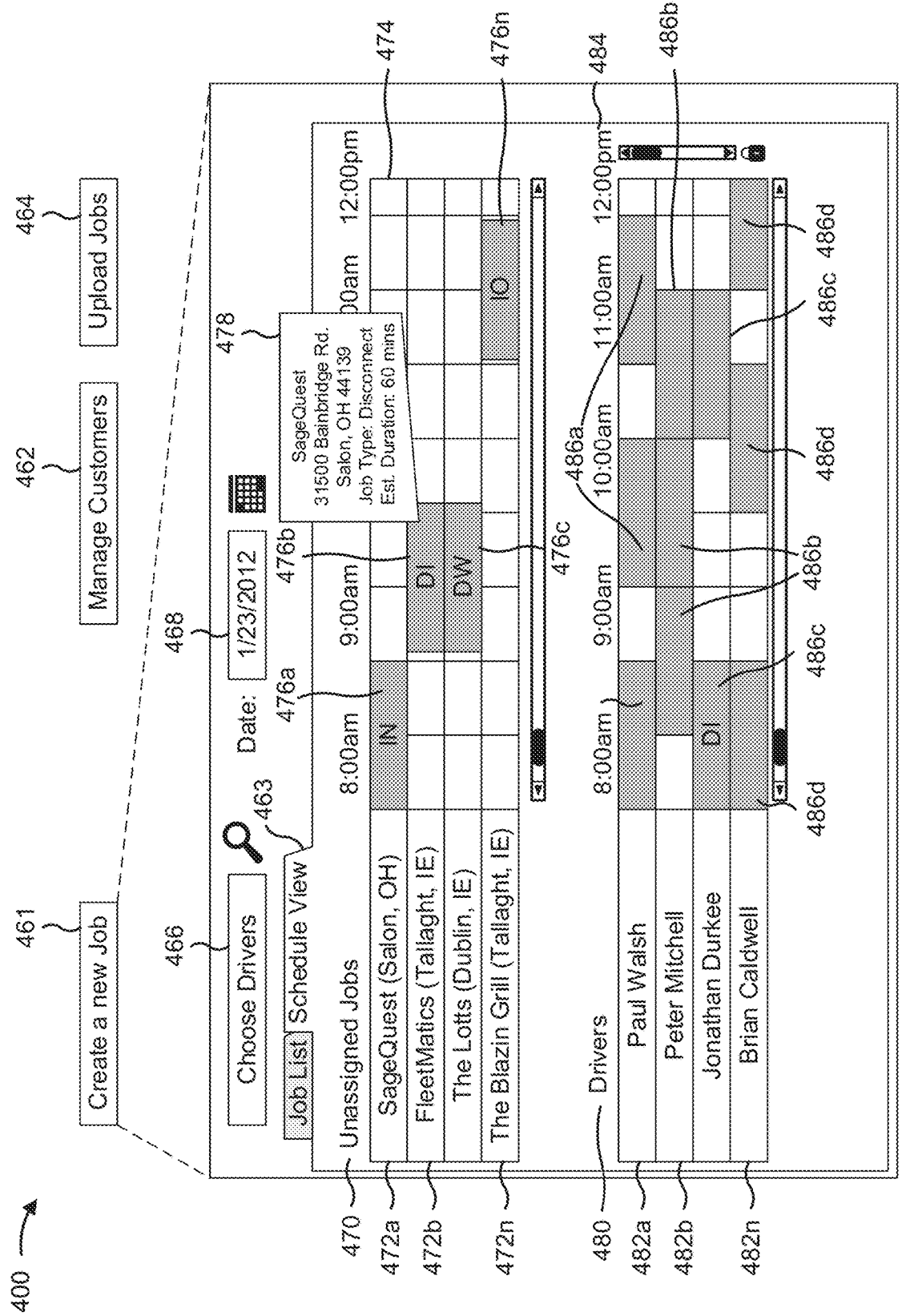

As shown in FIG. 4F, a user is presented with an interface 460 for viewing and managing jobs, shown as a "Schedule View" 463. The page includes the following fields and interface inputs, as follows:

Create New Job 461—This button will load a pop-up.

Figure 10:
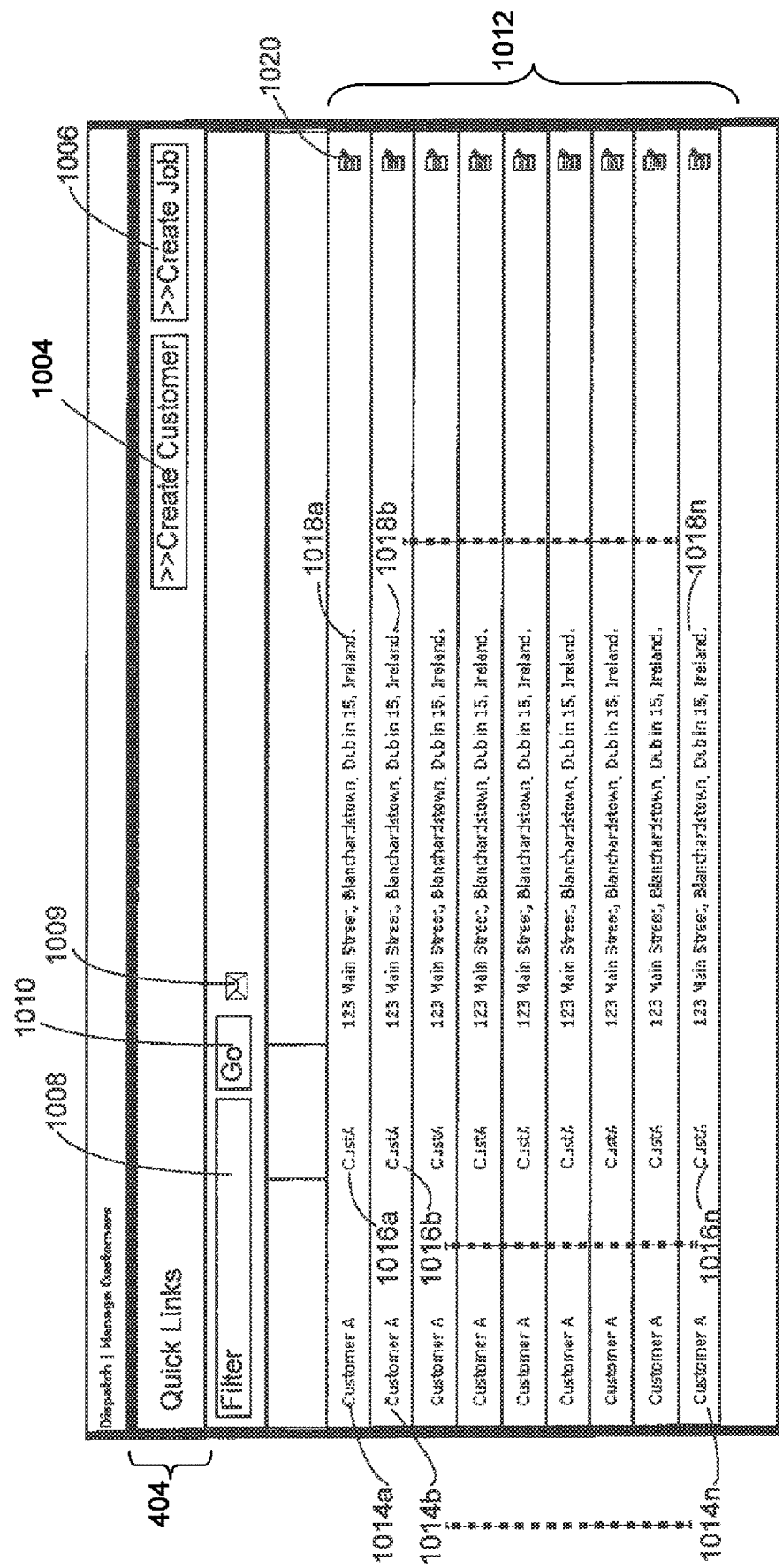
FIG. 10 depicts exemplary representations of a page for managing customers for a graphic user interface.

Manage Customers 462—Shortcut to a "manage customers" screen, an embodiment of which is described herein with respect to FIG. 10.

Upload Jobs 464—Shortcut to an upload jobs section configured to allow a user to upload jobs.

Choose Drivers 466—Enters full or partial name and click the search icon.

Date 468—Configured to allow a user to select the date the user wishes to view (defaults to current date).

In the embodiment shown in FIG. 4F, the system is configured to present the job listings via a "Schedule View" 463 tab, which includes tables 470, 480 that lists unassigned jobs 470 and drivers 480 along respective timeline grids are described below.

The "Unassigned Jobs" 470 region lists all jobs 472 $a$ . . . $n$ that have not been assigned to a driver along a grid. The table includes rows 472$a$, $b$ . . . $n$ for each job, and columns showing where the jobs are scheduled along a scrollable horizontal time axis 474, shown in half hour increments. The time axis 474 which shows blocked off scheduled times 476$a$ . . . $n$ for each job. The system is configured such that clicking on one of the jobs 476$a$ . . . $n$ in the timeline 474 grid will display 478 the name, address, job type and estimated duration.

In an embodiment, the system is configured allow a user select the job to perform actions, for example by right-clicking on a job to perform the following functions using, for example, embodiments as described herein:

1. Assign the job to a driver.
2. Find nearest drivers.
3. Update status.

The "Drivers" 470 region lists all drivers 482 $a$ . . . $n$ that are assigned jobs along a time grid. Another scrollable time axis 484 is configured to show blocked off scheduled time 486$a$ . . . $n$ for each driver. Clicking on one of the jobs in the timeline 484 grid will display the name, address, job type and estimated duration (not shown).

In another embodiment, the system is configured allow a user to right-click on a job to performing the following functions using, for example, embodiments as described herein:

1. Reassign the job to a different driver.
2. Find nearest drivers.
3. Update status.

Figure 5:
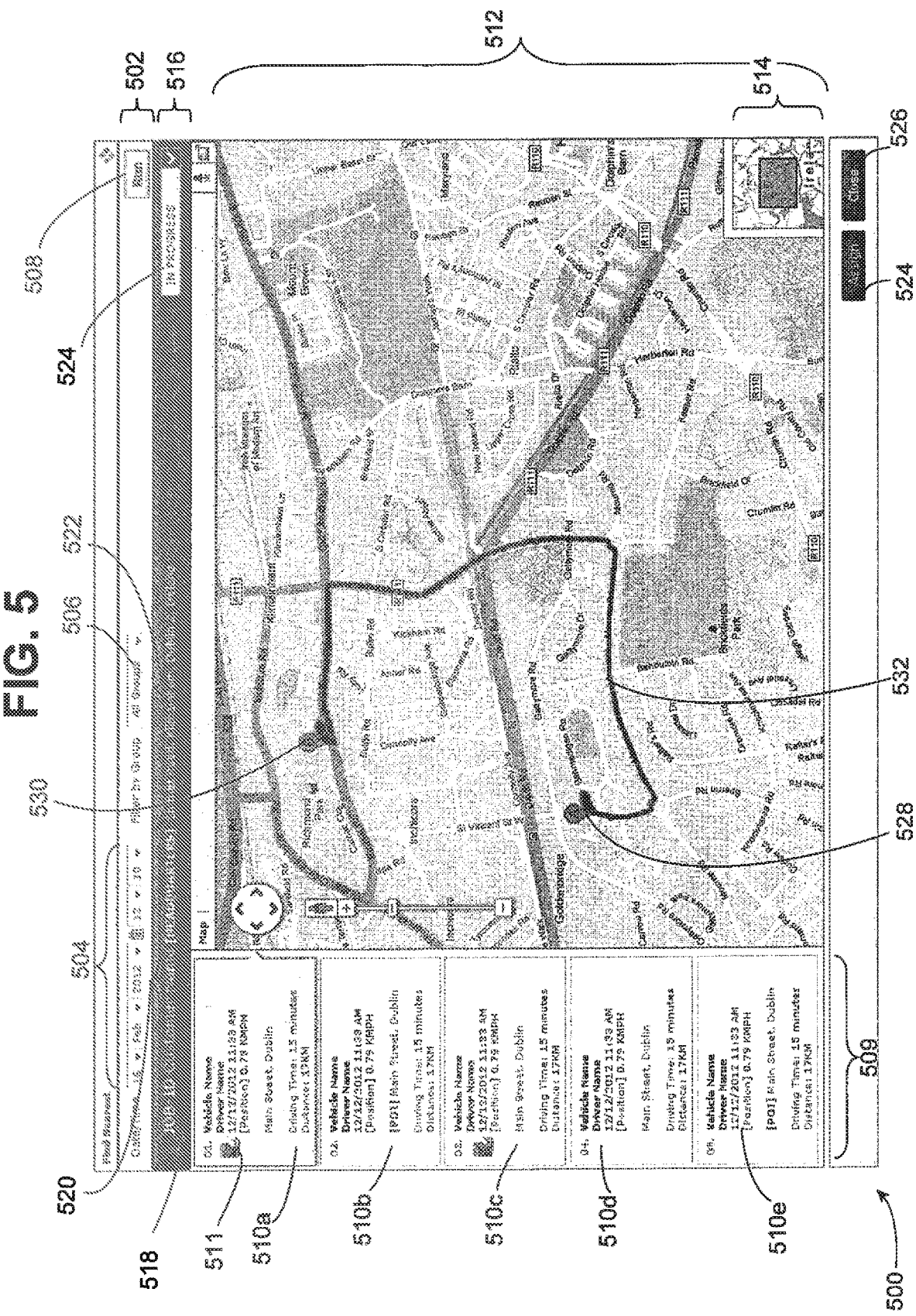
FIG. 5 depicts an exemplary representation of a page for finding nearest vehicles for graphic user interface.

As shown in FIG. 5, a user is presented with a "Find Nearest" interface 500, shown as a map page 500. As noted above, embodiments of the system are programmed work in conjunction with a system configured to provide a location and can also provide record of a route recorded by a GPS (Global Positioning System) device, for example, using an on-board unit which uses technology such as GPS to monitor a vehicle's positions and transmit wireless uploads to a central host system, as described herein. The system can also be configured to integrate with mapping systems or software which can and configured to display the location of each vehicle as well as calculate and project a route as a map 512, 514.

If a "Find Nearest" button is clicked from a work order or an action button 422*a* . . . *n* (see FIG. 4A) as described above, in addition to standard features, the following items are displayed:

A "Criteria" region 502 is configured to display filtering criteria. In an embodiment the criteria include a time criterion "Date/Time" 504. The date and time criteria can be configured to default to the current date and time, but can configured to allow a user to change the date and date range, including historically. The criteria also can include a group filter 506 to allow the vehicles to be filtered by group. Selecting a "Run" button 508 generates the results for the selected criterion for the page 500, shown in the embodiment as a vehicle list 509 and a map region 512.

An information bar 516 is configured to display:
Job ID 518
Customer Name 520
Address (with a "Point of Interest" or "POI" for the user, if applicable) 522 and Status dropdown 524.

A vehicle list 509 displays the nearest 5 vehicles 510*a* . . . 510*e*, however the system can be configured to show any number of vehicles. If the vehicles have an associated driver a driver name will appear. If a driver has a working version of a driver application for integrating with the system (not shown), a phone icon 511 will be visible. Once a vehicle with associated driver and working driver app is selected then the "Assign" button 524 will become active at the bottom. The user can close the page by selecting a close button 526.

For example in one embodiment, an on-board GPS unit uploads one or more locations of a vehicle a central host system. The location is presented to the user on the page 500, for example, as map layout 512. The mapping software calculates a route 532 from the vehicle's location 528 to a job location 530, which is displayed in the interactive graphic 512. Electronically presented maps are available over the Internet. See, for example, Google Maps (http://maps.google.com/maps), Microsoft Bing Maps, www.mapquest.com, www.mapsonus.com, www.maps.expedia.com, www.maps.yahoo.com (accessed through www.yahoo.com), www.maps.com, www.maps.excite.com, (accessed through www.excite.com), and www.mapblast.com. Also see U.S. Pat. Nos. 4,974,170, 5,682,525 and 6,148,260, and U.S. patent application Ser. No. 13/082,222 the entirety of each of which is incorporated by reference herein.

Figure 6:
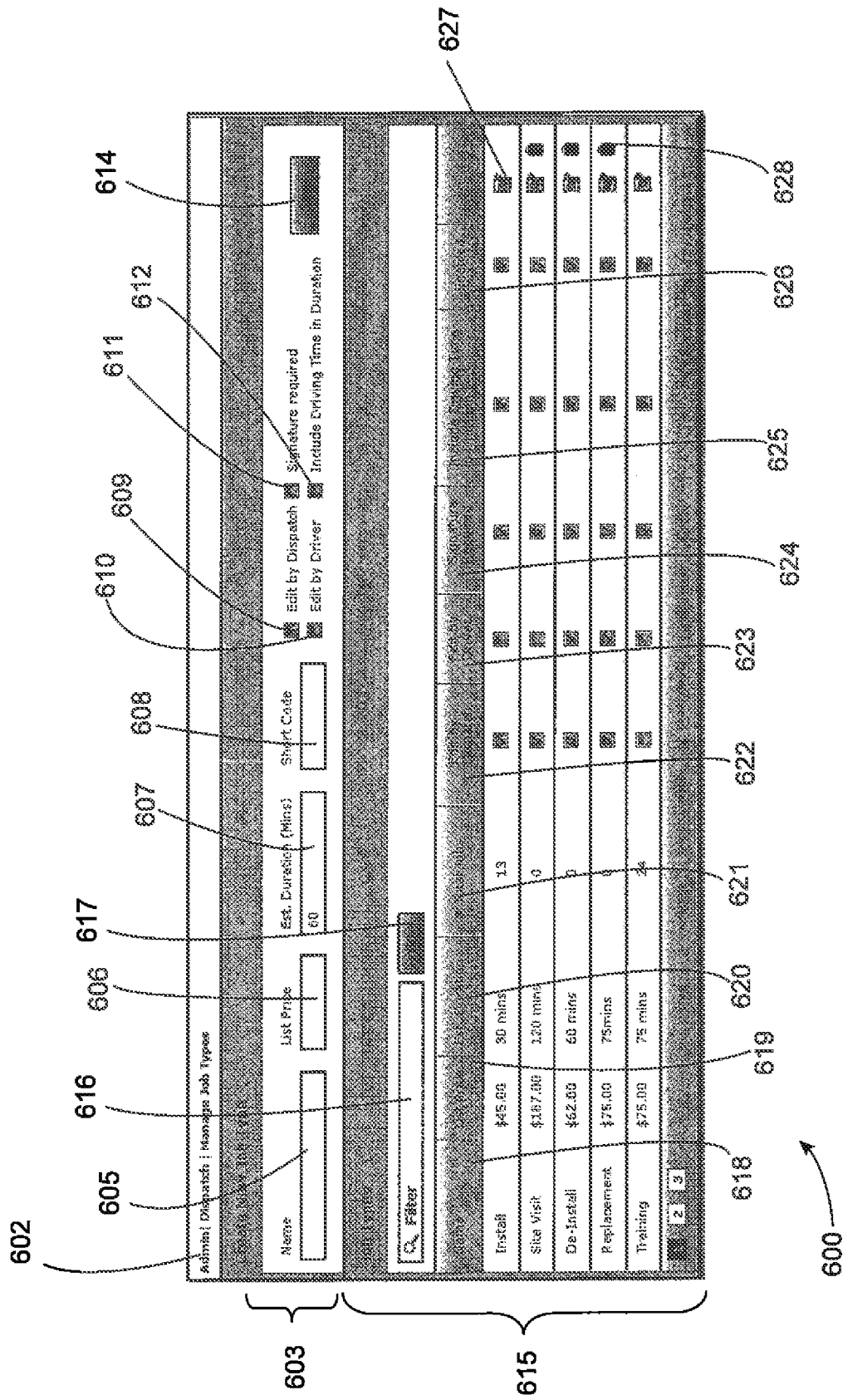
FIG. 6 depicts an exemplary representation of a page for managing job types for graphic user interface.

FIG. 6 shows an example of an interface 600 for viewing and managing current jobs, shown as a "Manage Job Types" 602 page. The interface is configured to allow users to create new and manage existing job types. In the embodiment the page is configured to be in an administrative section.

The page 600 is configured to such that a user can establish new categories and parameters jobs to be dispatched. Once a job type is created, jobs can be categorized by type. A "Create New Job Type"603 region includes the following entry fields or selectable parameters for creating the job type:

Name 605: the user enters the name of the new job type (e.g., Install, Site Visit, De-install, Replacement, Training, Delivery, etc)
List Price 606: the list price for the job type.
Est. Duration 607: the estimated duration to perform the job (e.g.: in minutes).

Short Code 608—a code for the categorizing of the job. In one embodiment the code is a mandatory feature, although in need not be.
Price Editable by Dispatch 609—(checkbox): allows a dispatcher to edit the list price.
Price Editable by Driver 610—(checkbox): allows the driver to edit the list price.
Signature required 611—(checkbox): the dispatch or work order of the job requires a signature by a customer.
Include Driving Time in Duration 612—(checkbox) includes driving time to dispatch location in overall job duration
Save button 614

A "Job Types" 615 section lists the job types for a fleet in a tabular format. A filter field 616 is configured to allow a user to type text into the text field and click a "Go" 617 button to execute a filtering function which filters a job types list 615; the job types list section 615 shows the filtered results accordingly. Once the filter has been run, the system can be configured to load a button or other input entry object that a user activates (e.g., via mouse click) to clear the list.

In one embodiment the columns are arranged by job type parameters such as those described above, including:
Name 618
Short Code (not shown)
List Price 619
Est. Duration 620
Number of Total jobs 621—total number of jobs for the job type, if any.
Edit by Dispatch 622—displays as an inactive check box (unless in edit mode)
Edit by Driver 623—displays as an inactive check box (unless in edit mode)
Signature Required 624—displays as an inactive check box (unless in edit mode)
Enabled 626—displays as an inactive check box (unless in edit mode)—please note: jobs are automatically enabled when created
Include Driving Time in Duration 625—displays as an inactive check box (unless in edit mode)

The system can also be configured top show an "Edit" object 627, shown as an icon, which when clicked or otherwise activated the text and check boxes in the appropriate row will become active and can be edited. The system can further be provided with a "Delete" 628 input, which when clicked or otherwise activated this will remove job. In an embodiment, a delete function is only available if the job type has no active jobs, in which case the system can be configured not to show the Delete if there are active jobs.

Figure 7:
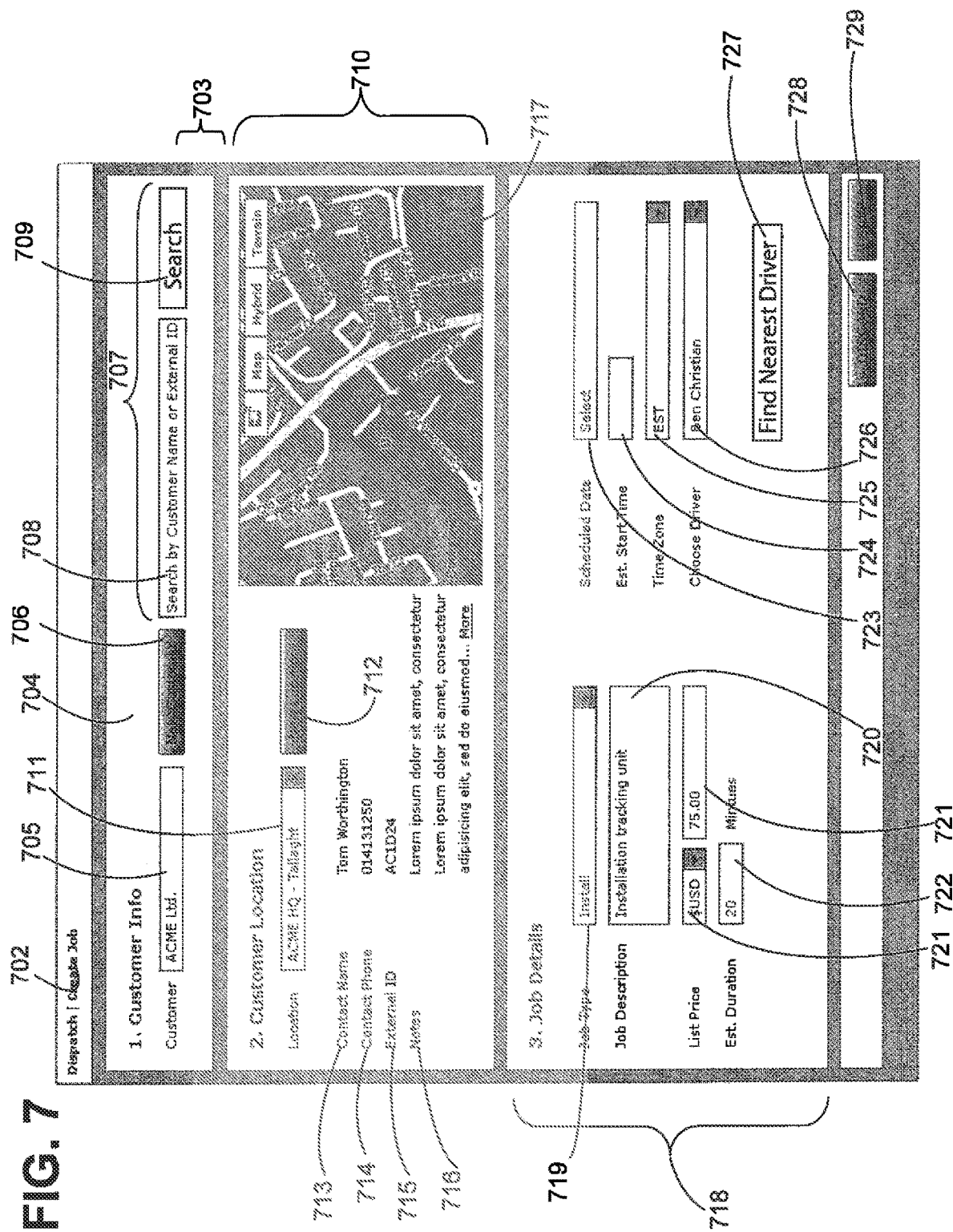
FIG. 7 depicts an exemplary representation of a page for creating jobs for graphic user interface.

FIG. 7 is an example of an interface 700 for creating jobs for a fleet customer, shown as a "Create Job" 702 page. The interface 700 is configured to allow users come to create new jobs for existing or new fleet customers. In an embodiment, the page 702 can be configured to present regions to be completed in sequence, although as will be appreciated other configurations are possible as well.

In an embodiment, the interface 700 is configured to present a customer information region 703 which includes areas for creating a new customer 704 or searching for an existing customer 707. A "Search Existing Customer" area 708 includes an input area or dropdown menu that is configured to allow a user to input a customer ID or customer name, which can be searched by clicking a "search" button 709. In an embodiment, a user can start typing in the search field 708 to load search results. The system if configured to load a list of customer names, for example with full names, and having the typed characters will be highlighted. The list is configured to search both customer names and an external ID starting with text. A "Create New Customer" area 704 includes a field 705 for inputting a new customer's name, which can be entered into the system via an input entry object 706 which a user activates (e.g., by clicking a button 706). The user can click this button 706 to generate a new customer, as described below.

Next, a "Customer Location" 710 region is configured so users can select a location from a selection input 711 based on the customer information from the customer information region 704. In an embodiment the customer location selection input 711 is a dropdown menu configured to default to the customer's headquarters or a default address associated with the customer. Alternatively, the system is configured to such that a user can input a new location, shown as a "New Location" button 712 a user can click to generate a new location. This loads a view/edit location pop-up with the customer name and external ID in place (see FIG. 8).

In an embodiment the "Customer Location" region 710 is also configured to include fields for further customer information including: Contact Name 713, Contact Phone Number 714, and an External ID 715 (configured to be associated with a location). A Notes area 716, can also be configured to show a partial amount of the notes, followed by a link at the end that says "More", which links to more detailed (e.g., when clicked, a speech bubble will load displaying the full note. A map 717 shows the selected location).

Next, a Job Details region 718 is configured so users can enter job details. As with the other regions, in an embodiment the Job Details regions includes user entry fields, including text fields and dropdown menus, comprising fields as follows:

Job Type 719—users can select one of the predefined job types.
Job Description 720.
List Price—721, which can be configured to load based on the job type 719 selected, and can also be configured to be edited thereafter. In an embodiment, If left blank the field defaults to 0.00. In an embodiment a default user currency can also be provided, which can be configured as a select list so users can change if required.
Estimated Duration 722—configured to be in minutes; but can be configured to show other time increments as well. The system can be configured to require the time increment be greater than zero.
Scheduled Start Date 723/Time 724
Time Zone 725—configured as a dropdown that defaults to a user's time zone, but can be configured to be changed.
Drivers 726—configured to have a user select from a dropdown, but can be configured as a text entry or search field.
Link for Find Nearest Drivers 727
Save 729—clicking this will save the job, close the window and display the job in the jobs list
Discard 728—clicking this will close the widow without saving the job.

In an embodiment all fields except "List Price" and "Find Nearest" can be configured to be mandatory, although as will be appreciated the system need not be configured thus, and that any fields can be made optional or mandatory depending on design or business needs.

As noted above, in an embodiment, the Link for Find Nearest Drivers 727 can also be provided. For example, the system can be configured with an option to show drivers who are available for dispatch, which can be enabled by default. An exemplary "Find Nearest" interface is described with respect to FIG. 5. The system can further be configured to communicate with drivers' devices that in turn signal to the system that the drivers are available for dispatch. For example, a driver can be provided with a portable device or application therefor, such as a PDA, smart phone, or GPS device for a vehicle, which includes functionality for signaling to the system, for example by a driver input or a vehicle state, that the driver is available for dispatch. The system then can be configured to show these drivers when the Find Nearest Drivers 727 link is selected.

In another embodiment the system can be configured to automatically populate with the 5 nearest drivers. The system can be configured to let users filter the driver list by groups (drivers attached to vehicles in groups. They can select one of the five vehicles and the map will update to show that vehicle in relation to the location (as for example, shown in FIG. 5 as described herein, where a user is presented with a "Find Nearest" interface). The nearest drivers list will include their current location and their estimated time from the customer location.

As shown in FIG. 8A, a user is presented with an interface 800 to create a job for a new customer. In an embodiment the interface 800 is accessible via an "Create Job|New Customer" 802 page. A customer information region 801 is shown as information bar 801 is configured to display:

Customer Name 804
Customer Number 806 each of which can be configured to allow user to enter or search for a new customer.

In an embodiment the new customer interface 800 comprises user entry fields for entering data about the new customer, including text fields and dropdown menus, comprising fields as follows:

Search for Address/POI 808
Address Results 810 (from search)
POI Type 812 (dropdown)
POI Name 814 (Address)
Address—loads based on selection and is not editable.
Contact Name 816
Contact Number 818
Location 820 ID—a location external ID
Location Notes 822
Show on map 826 (checkbox)
Show addresses 828 (checkbox)
Map 824—displays location based on search criteria selected.
[Save & Continue] 830—clicking this button will save the customer and the pop-up will refresh and load the previous create new job screen with the customer details.
[Cancel] 832—clicking this button will reload create new job screen without saving the customer details.

As noted above, in an embodiment, the system is programmed work in conjunction with a system configured to provide a location and can also provide record of a route recorded by a GPS (Global Positioning System) device, for example, using an on-board unit which uses technology such as GPS to monitor a vehicle's positions and transmit wireless uploads to a central host system, as described herein. The system can also be configured to integrate with mapping systems or software which can and configured to display the location of each vehicle as well as calculate and project route as a map 824.

For example, in one embodiment a user add jobs from a "Live Fleet" 324 (FIG. 3) page with GPS data and mapping software which tracks vehicles v1, v2 . . . vn. The page 324 can allow a user such as a dispatcher to, for example, locate and dispatch the closest vehicle to any job site and reroute the nearest vehicle as described herein. The page includes a map page similar to that of FIG. 8A, including a map 824 and a customer information area 801. The map can also includes objects for a "point of interest" or "POI" 838, 839. POIs are locations and addresses identified or saved by a user for easy reference. The page may also include "hotspots" or frequent stop locations identified by automated systems and methods, as described in U.S. patent application Ser. No. 13/458,088 entitled SYSTEM AND METHOD FOR AUTOMATED IDENTIFICATION OF FREQUENT STOP LOCATIONS FOR VEHICLE FLEETS the entirety of which is incorporated by reference herein. Vehicle locations 840 (i.e., as tracked by GPS and presented on the map 824) can also be presented.

For example in one embodiment, an on-board GPS unit uploads one or more locations of a vehicle a central host system. The location is presented to the user on the display device, for example, as map layout 824. Electronically presented maps are available over the Internet See, for example, Google Maps (http://maps.google.com/maps), Microsoft Bing Maps, www.mapquest.com, www.mapsonus.com, www.maps.expedia.com, www.maps.yahoo.com (accessed through www.yahoo.com), www.maps.com, www.maps.excite.com, (accessed through www.excite.com), and www.mapblast.com. Also see U.S. Pat. Nos. 4,974,170, 5,682,525 and 6,148,260, and U.S. patent application Ser. No. 13/082,222 the entirety of each of which is incorporated by reference herein.

Once the customer information is inputted, the user can add a job in a number of ways from various locations in the system interface, such as for example a Live Fleet page (see, e.g.: FIG. 3, "Live Fleet," 332). In one embodiment the system is configured to allow a user to enter a job for a customer depending on, among other things, the information the system has about the customer. For example, referring to the system interface 800 can be configured such that a user can:

1. Right-click on a POI 838 that is mapped to a customer
2. Right-click on a POI 839 that is not mapped to a customer
3. Right-click anywhere else on the map 824 (including vehicles 840, etc.)

These are described below.

If a user right-clicks on POI 838 that is mapped to a customer, the system is configured open a "create job" page (see as shown at FIG. 7) with customer and location populated. If a user to right-clicks on a POI 839 that is not mapped to a customer, or where a user right-clicks anywhere else on the map, doing so opens an "add location page," similar to that shown in FIG. 8A. As shown in FIG. 8B, the interface 800 is configured such that the user can search for customer in the customer field 804 by typing. This will give a select list of results beneath 835. The user can either choose an option from the list or use text entered to create a new customer 836, as described above. If a user chooses a customer the dropdown, the system is configured to populate the external ID field 806 of FIG. 8A. As will be appreciated, other page configurations could implemented or features added to assist the user. For example, for the POI 839 not being mapped to a Customer, text at the top that reads, "First, let's create a Customer for this Job . . . " could be added. Or a textbox could be configured to search for both Customer Name and Number (External ID) 806.

Figure 9A:
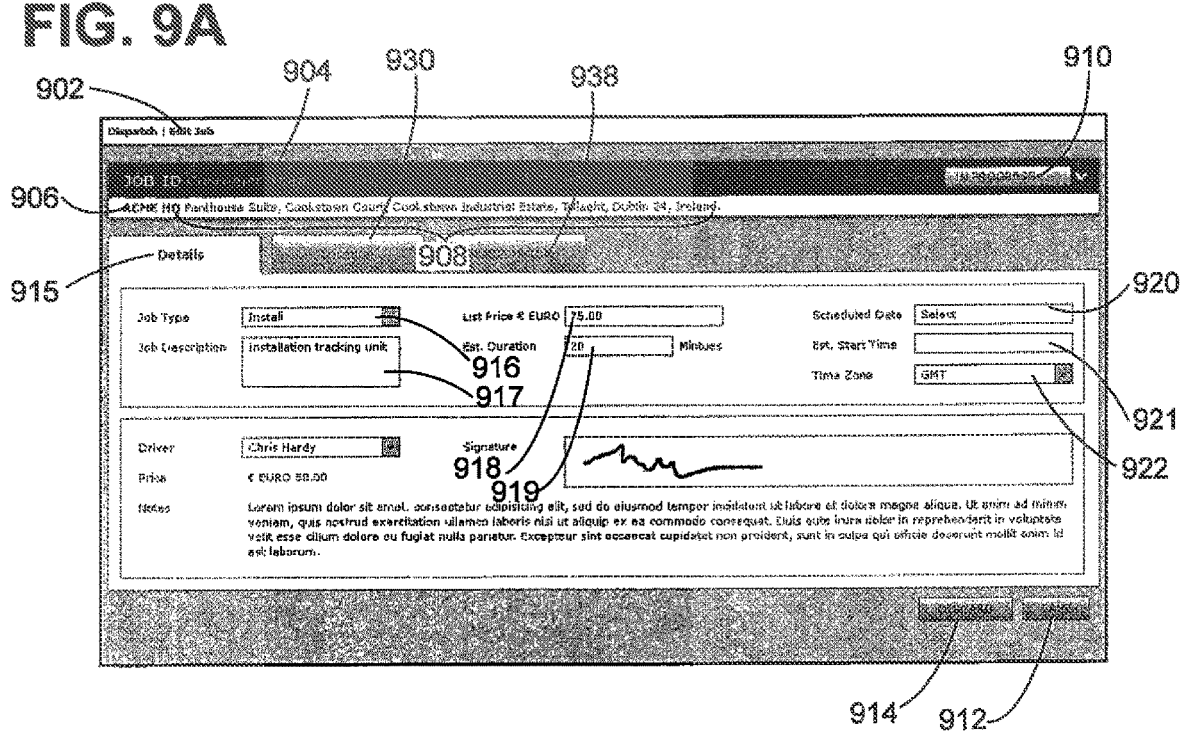
FIGS. 9A-9B depict exemplary representations of a page for editing a job for a graphic user interface.
Figure 9B:
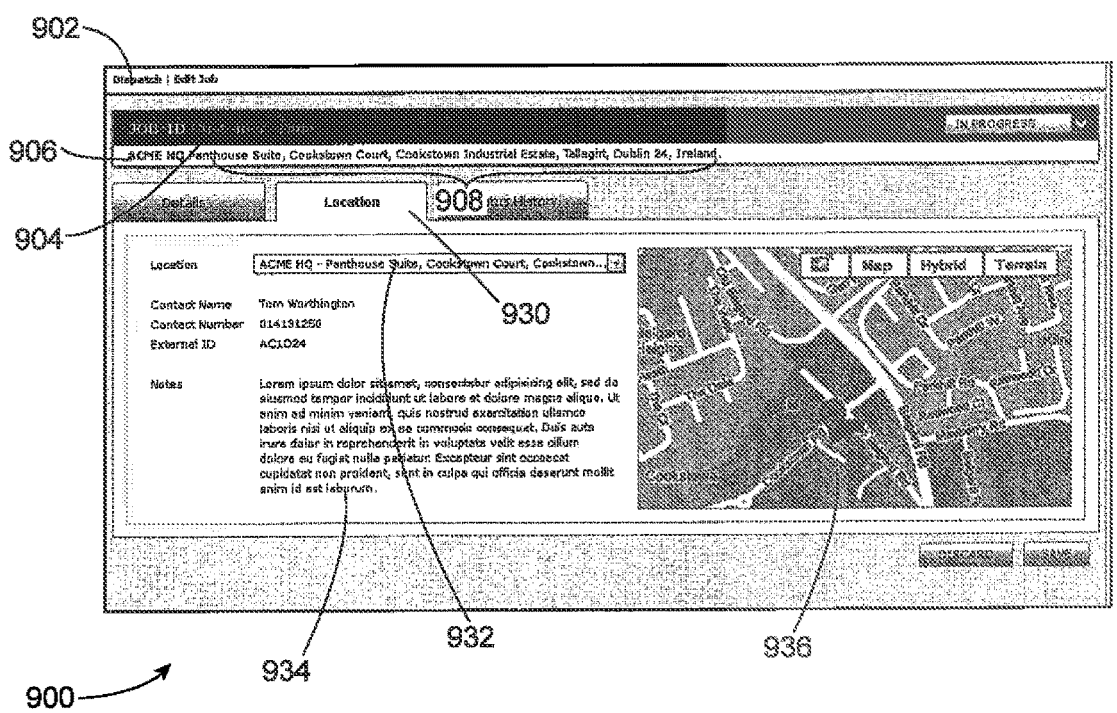

As shown in FIGS. 9A-9B, a user is presented with an interface 900 to edit a job. For example, the system could be configured to display an "Edit Job" interface 900, for example as a pop-up that displays when a user clicks on other otherwise accesses an editing function for a job listing.

The edit job screen 900 comprises an information region that includes basic information about a job, and basic interface objects as follows:
"Edit Job" page title 902—page tide
Job ID 904—text
Customer Name 906—text
Location Name and Address 908—text
Current Status 910—dropdown menu stating the jobs current status, which can be changed by the user
[Save] 912—saves changes and returns to previous page when clicked.
[Cancel] 914—closes window and returns to previous page when clicked.

The edit job screen 900 also comprises a details tab 915, shown in FIG. 9A, that includes user entry fields for editing data about a job, including text fields and dropdown menus, comprising fields as follows:
Job Type 916—dropdown (only editable when job is open and returned to dispatch)
Description 917—text box
List Price 918—text box (only editable when job is open and returned to dispatch)
Estimated Duration 919—text box
Scheduled Date 920—calendar selection
Estimated Start Time 921—text box
Time Zone 922—dropdown The edit job screen 900 also comprises a location tab 930, shown in FIG. 9B, that includes user entry fields for editing data about a job, including text fields and dropdown menus, comprising fields as follows:
Location 932—dropdown
Details 934—text (not editable), this includes all notes pertaining to the location.
Map 936

The edit job screen 900 also comprises a Status History tab 938, which can include a status log or other historical information about the status of the job (not shown).

As shown if FIG. 10, in an embodiment a user is presented with an interface 1000 for managing customers, shown as a "Manage Customers" page 1000. As shown in the figure, the page can be accessed via a "Quick Links" 404 region as described herein (see FIG. 4A, 404, 408). The Quick Links can also include "Create Customer" 1004 and "Create Job" 1006 links, which link to user interfaces that provide these functions, for example as described herein.

The page 1000 also comprises a Customer List 1012 configured to allow a user to view and edit customers of a fleet, which includes the following columns:
Customer Name 1014 a . . . n
External ID 1016 a . . . n
Head Office Address 1018 a . . . n
Edit 1020a . . . n—clicking this link will load an "edit customer" screen.

The interface page 1000 also includes a Filter 1008—configured to allow users to filter the customer list 1012 by typing all or partial customer name and clicking a "Go" object 1010. As with the other filters, a clear or "[x]" object 0109 can be provided to remove results.

In embodiment, the system is configured to include one or more Timecard Reports for driver working time and payroll. Timecard Reports can be configured to record a driver's work status based on vehicle activity or driver status input.

The Timecard Reports can be made available as a manual or an automated/scheduled report. The system can be configured to integrate the Timecard Reports with accounting systems and programs known in the art, for example such as the commercial products and systems for QuickBooks® and ADP®.

Drivers can be provided with an application which can be implemented to communicate with the system. In an embodiment, drivers can also be provided with a Timecard Application configured to allow a driver to input and record a driver's work status, such as Punch In/Out, breaks, and lunches. That status information will be sent to the system for use in Timecard reports as described herein. In an embodiment, if a vehicle fleet user or account is not using the Timecard Application feature, the system can be configured to provide reports based on vehicle activity using operational metrics based on GPS events. The system can be configured to allow a user to choose the operational metrics used to determine working hours reported, for example the operational metrics for a start and end of the day. For instance, a start of day can be determined by operational metrics such as "first movement," or "arrival at first stop," and so on.

As shown in FIG. 11A, in an embodiment, a Timecard Report includes a "Daily Timecard Report" is configured to show detailed stop information, and includes a reporting area for a driver to input information about a stop, for example the reason for a stop (e.g., to justify stops when there is an exception).

As shown in FIG. 11B, in an embodiment a Timecard Report includes a "Weekly Timesheet Report" configured to show the amount of hours worked summed for each day with overtime information.

Figure 11C:
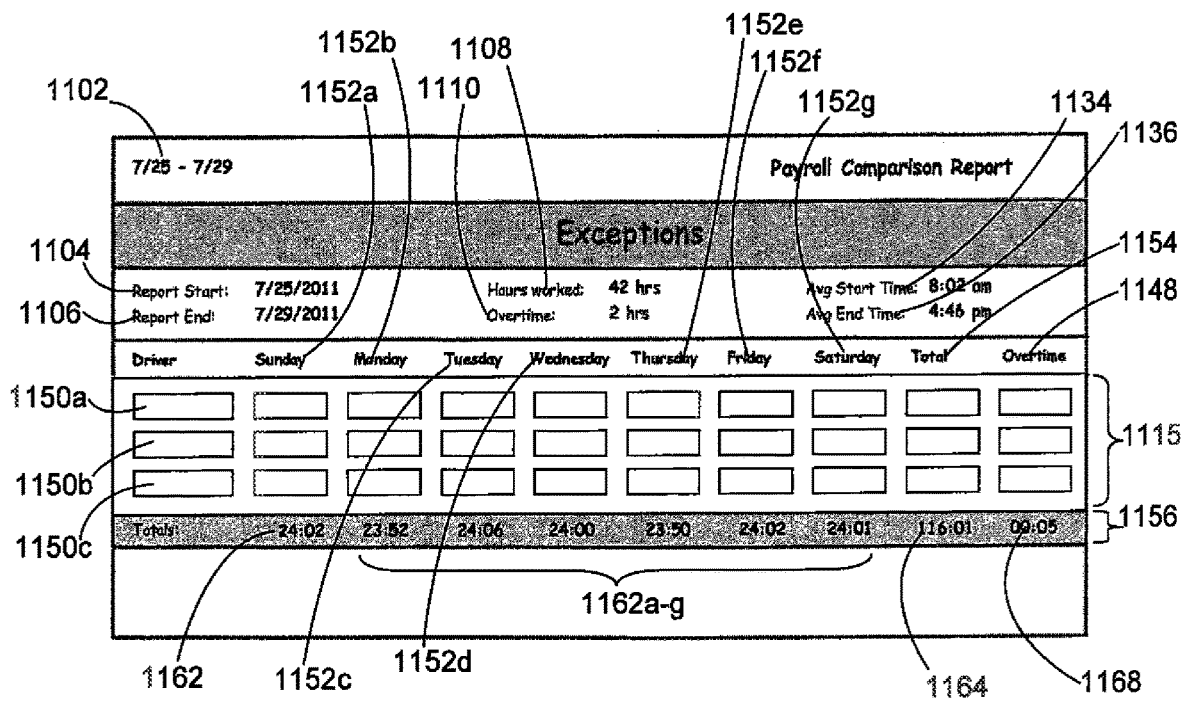

As shown in FIG. 11C, in an embodiment a Timecard Report includes a "Payroll Comparison Report" configured to show a summary of hours worked by day.

Figure 11D:
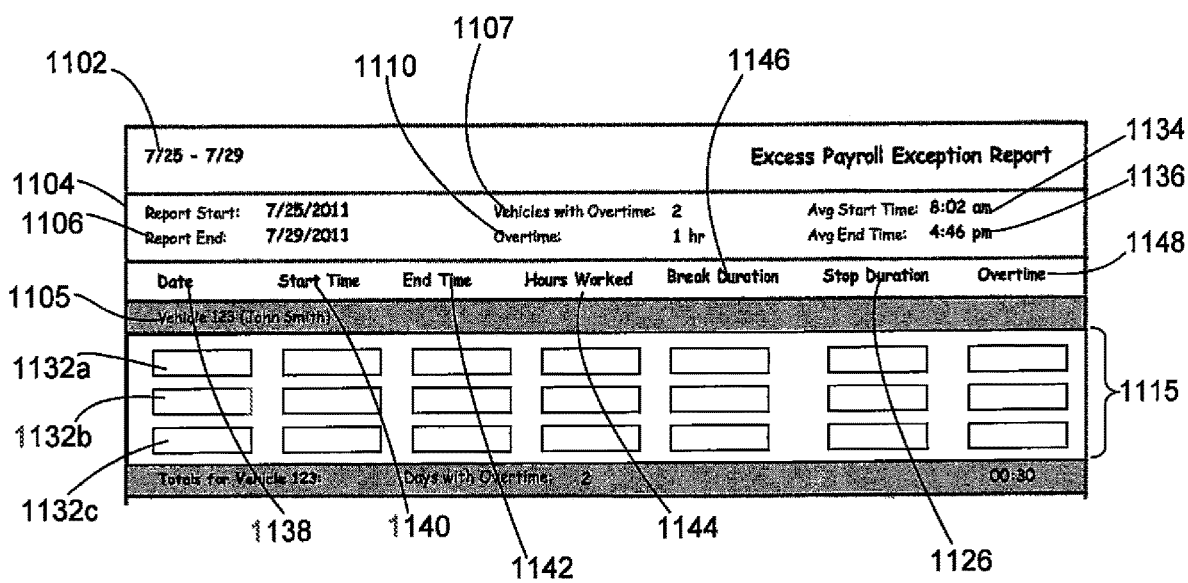

As shown in FIG. 11D, in an embodiment driver status information can be included in a Timecard Report comprising an "Excess Payroll Report."

In other embodiments, reports can include driver status information can be included in various Reports and interfaces (e.g., via the Dashboard and Trending) as well as provided for Alerts.

The system can be configured to show Timecard Reports based on hours worked and other vehicle and/or driver data. In each of the reports that follow, the system comprises configuration options that include parameters for determining a work schedule. The reports and system configurations for running reports are described below with the same reference numbers referring to the same or similar interface features. However, as will be appreciated, a particular report can be configured with or without various features or to comprise additional features.

In an embodiment, each report interface includes a selection region (not shown) for Vehicle/Driver Selection, which is configured to allow a user to select and run the based on drivers or vehicles. In one embodiment the selection region can include a dropdown menu allowing a user to select either "Vehicles" or "Drivers." In another embodiment, the selection region can be configured as textbox, whereby the system can be configured to search vehicles or drivers for that user (e.g. a fleet account). In another embodiment, radio buttons can be configured to allowing a user to select either Vehicles or Drivers. As will be appreciated, other inputs for selection can be implemented. Where a user selects Drivers, a list of drivers is presented to allow the user to select one or more drivers. Similarly, when a user selects "vehicles" a list of vehicles is selected. In embodiments, the system can be configured to default to either vehicles or drivers until the other is selected by a user.

In an embodiment, the system is configured to allow a user to run a report for a time period, for example a work week, a month, or one or more days, using a date range selection field, such as at least one "Date/Time Selection" 1102 selection field.

In an embodiment, the "Date/Time Selection" 1102 does not allow for a time of day selection, and the report is run only for entire days. In an embodiment, in addition to a date range and days of the week selection, the system is configured to allow a user to set a start and end points for the time range such that the report can be run to include partial days, as for example for shifts and "3rd shift" scenarios. The system can be configured to indicate the report only shows work activity between selected times, (e.g.: "Report Start" 1104 and "Report End" 1106). In an embodiment, the system is configured to run the report to capture 3d shift scenarios. For example, if the user enters an earlier time for the end of a shift "Report End" 1106) than for shift start ("Report Start" 1104), the system is configured to run the report with "Report End" 1106 run on the day after "Report Start" 1104.

As noted above, a user can select a Report based on operational metrics derived from vehicle activity. In an embodiment, the system is configured such that, if a user selects to run the report for drivers and a system shows the user's fleet account is enabled with the Timecard Application Feature, the user is given options to use either "Status Events" or "Vehicle Activity" (not shown). In an embodiment "Status Events" can be provided as a default option. If the fleet account does not have the Timecard Application Feature enabled, or is running the report for Vehicles, then the system is configured to present "Vehicle Activity" and define Start and End events.

The system is configured to allow a user to define parameters for start and end day triggers. Options to define start of day triggers include the following operational metrics including those derived from GPS event data:

Ignition ON

First Movement

Arrival at First Stop

Arrival at First Work Order

Arrival at one or more locations or areas. For example, the system can be configured to allow a user to select multiple POIs or predefined geographical areas for a start of day for vehicles within the fleet. If a vehicle arrives at any of these locations, the Start of Day is triggered.

Departure from one or more locations or areas. For example, the system can be configured to allow a user to select multiple POIs or predefined geographical areas for a start of day for vehicles within the fleet. If a vehicle departs from any of these locations, the Start of Day is triggered.

Options to define end of day include the following operational metrics:

Ignition OFF

Last Movement

Departure from Last Stop

Departure from Last Work Order

Last arrival at one or more locations or areas. For example, the system can be configured to allow a user to select multiple POIs or predefined geographical areas for an end of day for vehicles within the fleet. If the last arrival for a vehicle is any of these locations, the End of Day is triggered.

Last Departure from one or more locations or areas. For example, the system can be configured to allow a user to select multiple POIs or predefined geographical areas for an end of day for vehicles within the fleet. If the last departure for a vehicle is any of these locations, the End of Day is triggered.

In an embodiment, an option to "Ignore daily start or end travel when less than X miles," can be included so as to exclude undesired vehicle activity from the report. The system can be configured to allow a user to select the mileage for example, using a dropdown menu for 0 miles, 1 mile, 5 miles, and 10 miles (not shown).

In an embodiment, the system is configured to provide option to enter the number of hours that the driver is to be paid each day. The system can be configured to calculate the amount of overtime for a driver using this value along with options for "Additional Paid Time" and "Unpaid Break Time." For overtime, the system can be configured to either have the hours worked by day, or in another embodiment, the system is configured to have hours worked by a multiple of 7 days. The system is also configured such that if the user is running the report using vehicle activity, a user is presented with a number of additional options to calculate hours worked, including an option to add an amount of "Additional Paid Time" to be added to the Hours Worked value and an option to add an amount of "Unpaid Break Time" to be deducted from the Hours Worked value.

In embodiments, for example embodiments including the Daily Timecard Report and Weekly Timesheet Report described herein, the system can also be configured with a "Print Option." The Print Option includes a Print Output configured such that for multiple days and/or drivers, the system is configured such that the report prints with a page break between the shifts/days and each driver. The system is also configured to allow a print option for a landscape mode, which is used when printing to ensure that the entire report is visible, and further prints with a "Notes" column. The "Notes" column can show in the printout, and is configured to allow a driver to give an explanation for each stop. At the bottom of each driver's shift/day, the report can include an area for the driver's signature.

In an embodiment, the system interface can be configured to include an "Additional Option for Automated/Schedule Report" or "Automated Output" which is configured to send the report directly to each driver. The drivers selected for the Automated/Schedule report would get just that driver's report, whereas other recipients would get a report for all drivers for the Report. The Automated Output is configured with the elements that the "Print Option" has.

In one embodiment, the Timecard Report includes a Daily Timecard Report as shown at FIG. 11A, the output of which is presented as follows. In certain embodiments the report is grouped by vehicle 1105, shown for example a "John Smith—Vehicle 47." The report then shows the stops for the vehicle. The interface includes a Report Header area, which displays
  Total Hours Worked 1108
  Total Overtime 1110
  Total Travel Duration 1112
  Total Stop Duration 1114
The system interface also includes a Stops/Hours report area 1115 where stops are presented in rows 1116a . . . n. The system interface also in includes columns for the stop rows, which include:
  Arrival Time 1118
  Location (both Address and "POI" or other geographic identifier (e.g.: a "Geofence") 1120
  Travel Duration 1122
  Distance Traveled 1124
  Stop Duration 1126
  A Notes area (e.g., for allowing the driver to justify stops) 1128.

If the system's user account in enabled with the Timecard Application Feature, and the driver has logged status events that fall within the time periods of the report, then the report can be configured with further rows for the logged status events be included amongst the stops wherever they fall chronologically.

The Timecard Report also includes a signatures area, shown in a footer area 1129, which includes a signature line 1130 for the driver and a signature line for manager 1131.

In one embodiment, the Timecard Report includes a Weekly Timesheet Report as shown at FIG. 11B, the output of which is presented as follows. In certain embodiments the report is grouped by date or thy 1132, for a vehicle 1105. The report included individual days 1132a . . . n.

The interface includes a Report Header area, which displays
  Report Start 1104
  Report End 1106
  Total Hours Worked 1108
  Total Overtime 1110
  Avg Start Time 1134
  Avg End Time 1136.
    The system interface also includes a Stops/Hours report area 1115 where workdays presented in rows 1116a . . . n. The system interface also in includes columns for the workday rows, which include:
  Day/Date 1138
  Start Time 1140
  End Time 1142
  Hours Worked 1144
  Break Duration (if showing Status Events) 1146
  Personal Duration (if showing Status Events) (not shown)
  Stop Duration 1126
  Overtime 1148.

The Weekly Timesheet Report also includes a signatures area, shown in a footer area 1129, which includes a signature line 1130 for the driver and a signature line for manager 1131.

In one embodiment, the Timecard Report includes a Payroll Comparison Report as shown at FIG. 11C, the output of which is presented as follows. The interface includes a Report Header area, which displays
  Report Start 1104
  Report End 1106
  Total Hours Worked 1108
  Total Overtime 1110
  Avg Start Time 1134
  Avg End Time 1136.
    The system interface also includes a Stops/Hours report area 1115 where drivers or vehicles are presented in rows 1150a . . . n. The system interface also in includes columns for the workday rows, which include:
  Drivers or Vehicles 1150a . . . n, whichever was selected on the report configuration
  A Column for each day of the week 1152a . . . g with the number of Hours Worked in each cell. For the days of the week that were not selected or do not have activity, cells can be filled with a "-".
  Total Hours Worked 1154 summing the hours worked for the week.
  Total Overtime 1154 showing the amount of overtime for each driver.

The Payroll Comparison Report also includes a footer area 1156, which includes:
Total Hours Worked 1162a . . . g for each day of the week
Grand Total 1164
Total Overtime 1168.
In one embodiment, the Timecard Report includes a Excess Payroll Exception Report as shown a FIG. 11D for a vehicle or driver 1105, the output of which is presented as follows. In certain embodiments the report is grouped by date or day 1132, for a vehicle 1105. The report included individual days 1132a . . . n.
The interface includes a Report Header area, which displays:
Report Start 1104
Report End 1106
Vehicles with Overtime 1107
Total Overtime 1110
Avg Start Time 1134
Avg End Time 1136.
  The system interface also includes a Stops/Hours report area 1115 where workdays presented in rows 1116a . . . n. The system interface also in includes columns for the workday rows, which include:
Day/Date 1138
Start Time 1140
End Time 1142
Hours Worked 1144
Break Duration (if showing Status Events) 1146
Personal Duration (if showing Status Events) (not shown)
Stop Duration 1126
Overtime 1148.
The Weekly Timesheet Report also includes a signatures area, shown in a footer area 1129, which includes a signature line 1130 for the driver and a signature line for manager 1131.

In an embodiment, the system is configured to allow a user to set parameters for logging hours worked by drivers for a fleet. An administrative section of an interface (not shown) can be configured such that a user can assign a driver to a vehicle, as well as add, edit, or delete drivers. The system can also be configured to allow a user to add contact information for the driver, such as an e-mail address or a phone number. The system can also be configured to track one or more vehicles for the fleet, including keeping a history of driver assignment changes The administrative section can also include a control enter (e.g. "FleetMatics/Control Center Preferences") where a user can set parameters for logging driver hours. For example, the control center could allow a user to:
Define Start and End of day triggers;
Define Lunch and Break durations; and
Define Benchmarks for Start and End day times.
The administrative section can also include an area for setting reporting metrics, for example in the "Dashboard" (FIG. 3, 320) area, including:
A "Start Time" metric; and
An "Hours Worked" metric with "Overtime" incorporated.

As noted above, in embodiments drivers can also be provided with a Timecard Application configured to allow a driver to input and record a driver's work status, such as Punch In/Out, breaks, and lunches. That status information will be sent to the system for use in Timecard reports. In embodiments where drivers are provided with a timecard application, a vehicle identification "Vehicle ID" can be used as input on the timecard to assignment the driver to a vehicle. Drivers can also be assigned a Driver Number that comprises a unique link to the driver associated with a driver application. The application can be configured such that drivers can add electronic contact information, such as an Email address, for each driver in order to for example, send the reports to the driver. A Driver can also be provided with a link to an external site for reports as well.

Although vehicle events can trigger a status event for driver status information (e.g.: engine On/Off after a time parameter triggers a Late Start Alert), as the status behavior is driver-based, a user's selection for a driver status report is to select drivers that a user wants to run the report for (as opposed to a vehicle or the current driver of the vehicle). Similarly, the system is configured to account for driver assignment history when determining what vehicle activity is correct for the driver and time period the report is run for.

In an embodiment driver status information can be included to provide Alerts as described herein, the Alerts including:
A Late Start Alert
An Overtime Alert
An Off-hours Use Alert.
In an embodiment, driver status information can be included in Dashboard and Trending reports and graphics, including reports for:
An Hours Worked metric
A Late Start metric
An Overtime metric.
Examples of Trending and Dashboard reports and graphics in which driver status information can be included are described above and in U.S. patent application Ser. No. 13/097,689, entitled SYSTEM AND METHOD FOR PROVIDING VEHICLE AND FLEET PROFILES AND PRESENTATIONS OF TRENDS, the entirety of which is incorporated by reference hereby.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention.

Therefore, the scope of the appended claims should not be limited to the description and illustrations of the embodiments contained herein.

The invention claimed is:

1. A system, comprising:
a memory; and
one or more processors, communicatively coupled to the memory, to:
receive Global Positioning System (GPS) event data transmitted from a plurality of GPS devices, each GPS device, of the plurality of GPS devices, being associated with a vehicle of a plurality of vehicles;
store the GPS event data for the plurality of vehicles in a GPS event database;
analyze the GPS event data to derive a plurality of operational metrics for each vehicle of the plurality of vehicles,
the plurality of operational metrics including at least one of:
an engine power metric that indicates an amount of time an engine of the vehicle is on or off, or
a vehicle idling metric that indicates an amount of time the vehicle is stopped while the engine of the vehicle is on;
provide, for selection, at least one operational metric of the engine power metric or the vehicle idling metric derived from the GPS event data for the plurality of vehicles;
provide, for display on a graphic user interface, a representation of the at least one operational metric;
determine a trend, over a particular time period, for the at least one operational metric for the plurality of vehicles based on comparing information associated with the at least one operational metric against at least one criterion,
the at least one criterion including
a criterion using industry data;
trigger an alert based on the trend satisfying a threshold;
determine a vehicle, of the plurality of vehicles, that is a greatest cause for the trend based on the alert being triggered;
provide, for display on the graphic user interface, the alert that indicates the trend and the vehicle that is the greatest cause for the trend; and provide, for display on the graphic user interface, driver status information identifying another alert, the other alert including an Overtime Alert.

2. The system of claim 1, wherein the at least one operational metric includes information identifying at least one of:
ignition ON,
first movement,
arrival at first stop,
arrival at first work order,
arrival at one or more locations or areas,
departure from one or more locations or areas,
ignition OFF,
last movement,
departure from last stop,
departure from last work order, or
last departure from one or more locations or areas.

3. The system of claim 1, wherein the one or more processors are further to:
run a Daily Timecard Report.

4. The system of claim 1, wherein the one or more processors are further to:
run a Weekly Timesheet Report.

5. The system of claim 1, wherein the one or more processors are further to:
run a Payroll Comparison Report for a plurality of drivers.

6. The system of claim 1, wherein the one or more processors are further to:
provide driver status information for display on the graphic user interface.

7. The system of claim 1, wherein the one or more processors are further to:
provide driver status information for display in a report.

8. The system of claim 7, wherein the report includes at least one of:
an Excess Payroll Report, or
an Off-hours Use Report.

9. The system of claim 1, wherein the one or more processors are further to:
provide driver status information for display on the graphic user interface as another alert.

10. The system of claim 1, wherein the other alert further includes
an Off-hours Use Alert.

11. The system of claim 1, wherein the at least one operational metric includes:
an Hours Worked metric,
a Late Start metric, and
an Overtime metric.

12. The system of claim 1, where each GPS device, of the plurality of the GPS devices, is configured to be operational to transmit the GPS event data when an engine of an associated vehicle, of the plurality of vehicles, is on, and
where the one or more processors, when analyzing the GPS event data, are to:
determine the engine power metric for a respective vehicle based on when a respective GPS device is operational to transmit, and
determine the vehicle idling metric for a respective vehicle based on when the respective GPS device is operational to transmit and tracking a stopped state of the vehicle via a respective GPS device.

13. The system of claim 1, wherein the determined trend includes a high speed event trend over the particular time period.

14. A method, comprising:
receiving, by a device, Global Positioning System (GPS) event data transmitted from a plurality of GPS devices, each GPS device, of the plurality of GPS devices, being associated with a vehicle of a plurality of vehicles;
storing, by the device, the GPS event data for the plurality of vehicles in a GPS event database;
analyzing, by the device, the GPS event data to derive a plurality of operational metrics for each vehicle of the plurality of vehicles,
the plurality of operational metrics including at least one of:
an engine power metric that indicates an amount of time an engine of the vehicle is on or off, or
a vehicle idling metric that indicates an amount of time the vehicle is stopped while the engine of the vehicle is on;
providing, by the device and for selection, at least one operational metric of the engine power metric or the vehicle idling metric derived from the GPS event data for the plurality of vehicles;

providing, by the device and for display on a graphic user interface, a representation of the at least one operational metric;

determining, by the device, a trend over a particular time period for the at least one operational metric for the plurality of vehicles based on comparing information associated with the at least one operational metric against at least one criterion, the at least one criterion including
a criterion using industry data;

triggering, by the device, an alert based on the trend satisfying a threshold;

determining, by the device, a vehicle, of the plurality of vehicles, that is a greatest cause for the trend based on the alert being triggered;

providing, by the device and for display on the graphic user interface, the alert that indicates the trend and the vehicle that is the greatest cause for the trend; and providing, for display on the graphic user interface, driver status information in a report, the report including an Excess Payroll Report.

15. The method of claim 14, wherein the at least one operational metric includes information identifying at least one of:
ignition ON,
first movement,
arrival at first stop,
arrival at first work order,
arrival at one or more locations or areas,
departure from one or more locations or areas,
ignition OFF,
last movement,
departure from last stop,
departure from last work order, or
last departure from one or more locations or areas.

16. The method of claim 14, wherein the method further comprises:
running a Daily Timecard Report.

17. The method of claim 14, wherein the method further comprises:
running a Weekly Timesheet Report.

18. The method of claim 14, wherein the method further comprises:
running a Payroll Comparison Report for a plurality of drivers.

19. The method of claim 14, wherein the method further comprises:
providing driver status information for display on the graphic user interface.

20. The method of claim 14, wherein the report further includes an Off-hours Use Report.

21. The method of claim 14, wherein the method further comprises:

providing driver status information for display on the graphic user interface as another alert.

22. The method of claim 21, wherein the other alert includes an Overtime Alert and an Off-hours Use Alert.

23. The method of claim 14, wherein the at least one operational metric includes:
an Hours Worked metric,
a Late Start metric, and
an Overtime metric.

24. A method, comprising:
receiving, by a device, Global Positioning System (GPS) event data transmitted from a plurality of GPS devices, each GPS device, of the plurality of GPS devices, being associated with a vehicle of a plurality of vehicles;

storing, by the device, the GPS event data for the plurality of vehicles in a GPS event database;

analyzing, by the device, the GPS event data to derive a plurality of operational metrics for each vehicle of the plurality of vehicles, the plurality of operational metrics including at least one of:
an engine power metric that indicates an amount of time an engine of the vehicle is on or off, or
a vehicle idling metric that indicates an amount of time the vehicle is stopped while the engine of the vehicle is on;

providing, by the device and for selection, at least one operational metric of the engine power metric or the vehicle idling metric derived from the GPS event data for the plurality of vehicles;

providing, by the device and for display on a graphic user interface, a representation of the at least one operational metric;

determining, by the device, a trend over a particular time period for the at least one operational metric for the plurality of vehicles based on comparing information associated with the at least one operational metric against at least one criterion, the at least one criterion including criterion using industry data;

triggering, by the device, an alert based on the trend satisfying a threshold;

determining, by the device, a vehicle, of the plurality of vehicles, that is a greatest cause for the trend based on the alert being triggered;

providing, by the device and for display on the graphic user interface, the alert that indicates the trend and the vehicle that is the greatest cause for the trend; and providing by the device and for display on the graphic user interface, driver status information as another alert, the other alert including an Overtime Alert.

* * * * *